United States Patent
LeGrand

(10) Patent No.: US 11,649,054 B1
(45) Date of Patent: May 16, 2023

(54) BISTABLE PACKAGE DELIVERY SYSTEMS FOR AERIAL VEHICLES

(71) Applicant: Amazon Technologies, Inc., Seattle, WA (US)

(72) Inventor: Louis LeGrand, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 366 days.

(21) Appl. No.: 16/878,403

(22) Filed: May 19, 2020

(51) Int. Cl.
  *B64D 1/12* (2006.01)
  *B66D 3/18* (2006.01)
  *B66C 1/34* (2006.01)

(52) U.S. Cl.
  CPC ............. *B64D 1/12* (2013.01); *B66C 1/34* (2013.01); *B66D 3/18* (2013.01); *B64C 2201/128* (2013.01)

(58) Field of Classification Search
  CPC .. B64D 39/024; B64D 2201/128; B64D 1/12; B66D 3/18; B66C 1/14; B66C 1/34; B66C 1/38
  See application file for complete search history.

(56) References Cited

U.S. PATENT DOCUMENTS

| | | | | |
|---|---|---|---|---|
| 3,032,365 | A * | 5/1962 | Campbell | B64C 27/04 89/1.51 |
| 3,601,342 | A * | 8/1971 | Piasecki | B64D 1/22 212/230 |
| 9,174,733 | B1 * | 11/2015 | Burgess | B64C 39/024 |
| 9,650,136 | B1 * | 5/2017 | Haskin | B64D 1/12 |
| 9,688,404 | B1 * | 6/2017 | Buchmueller | B64D 1/12 |
| 10,071,804 | B1 * | 9/2018 | Buchmueller | B64D 1/12 |
| 10,399,704 | B2 * | 9/2019 | Briggs, IV | B64F 3/02 |
| 10,456,926 | B1 * | 10/2019 | Naylor | B25J 15/0033 |

* cited by examiner

*Primary Examiner* — Dean J Kramer
(74) *Attorney, Agent, or Firm* — Athorus, PLLC

(57) ABSTRACT

Package delivery systems and methods may include a bistable beam coupled to an aerial vehicle, a bistable hook coupled to an end of the bistable beam, and a package carried by the bistable hook. The bistable beam may move between a reeled position and an extended position, and the bistable hook may move between a closed position and an open position. In addition, the bistable beam may include frangible connections or portions. Further, release or disconnection of frangible connections or portions of the bistable beam, as well as operations of the bistable hook, may be effected by passive or active methods.

18 Claims, 10 Drawing Sheets

BISTABLE PACKAGE DELIVERY SYSTEMS FOR AERIAL VEHICLES

BACKGROUND

Unmanned vehicles, such as unmanned aerial vehicles, ground based vehicles, and water based vehicles, are continuing to increase in use. For example, unmanned aerial vehicles are often used by hobbyists to obtain aerial images of buildings, landscapes, etc. Likewise, unmanned ground based vehicles are often used in materials handling facilities to autonomously transport inventory within the facility. In addition, unmanned vehicles, such as unmanned aerial vehicles, ground based vehicles, and water based vehicles, may be used for delivery services. Accordingly, there is a need for lightweight, reliable, and robust package delivery systems to facilitate delivery services by unmanned vehicles.

DETAILED DESCRIPTION

Figure 1:
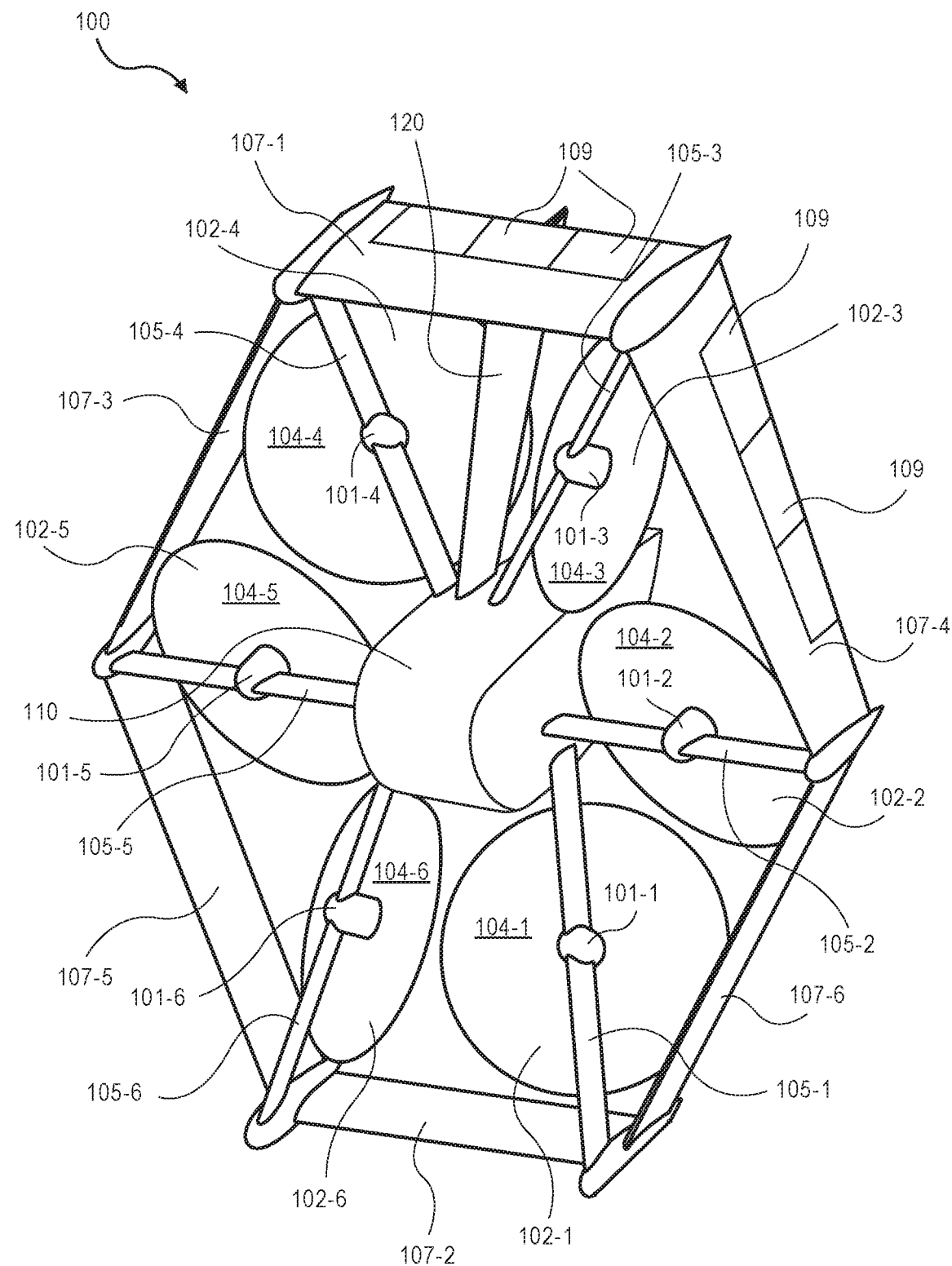
FIG. 1 is a schematic perspective view diagram of an aerial vehicle with a ring wing that is substantially hexagonal in shape and that surrounds a plurality of propulsion mechanisms, in accordance with implementations of the present disclosure.

As is set forth in greater detail below, implementations of the present disclosure are directed to bistable package delivery systems and methods to deliver packages or objects, e.g., by aerial vehicles, in a safe, efficient, and reliable manner.

Generally, aerial vehicles having package delivery systems that deliver objects after landing may require complex sensor systems and sensor data processing systems, e.g., near surround awareness systems, to detect surfaces for safe and reliable landing, and to detect an environment or surroundings and ensure safety during delivery. In addition, aerial vehicles having package delivery systems that deliver objects by dropping objects from a short height, e.g., about four meters above ground, may cause damage to objects or the environment, may require specially designed packaging to prevent damage to dropped objects, and may result in a poor experience from a customer perspective. Further, aerial vehicles having package delivery systems that deliver objects by lowering objects from a short height, e.g., using a tether or string, may require careful and reliable navigation and/or operations to prevent tangling of the tether during extension/retraction, to prevent ensnarement of the tether in propulsion mechanisms such as propellers, to prevent destabilization of aerial vehicles during extension/retraction and due to moving or swinging objects, and to prevent snagging of the tether on portions of the environment.

In example embodiments of the bistable package delivery systems and methods described herein, the bistable package delivery system may include a bistable beam and a bistable hook. The bistable beam may be coupled at a first end to a portion of an aerial vehicle, and the bistable beam may be coupled at a second end to a bistable hook. In addition, the bistable beam may be coupled to an actuator to move the bistable beam between a reeled position and an extended position.

For example, the bistable beam may have two substantially stable positions or configurations, such as the reeled position and the extended position. In the reeled position, the bistable beam may be reeled in, retracted, and/or rolled up and have a substantially flat cross-sectional shape. In the extended position, the bistable beam may be unreeled, extended, and/or unrolled and may have an at least partially curved cross-sectional shape, such as a partial curve or arc shape, and/or a tubular or circular shape.

In addition, the bistable hook may also have two substantially stable positions or configurations, such as a closed position and an open position. In the closed position, the bistable hook may couple to and carry an object or package. In the open position, the bistable hook may release the object or package.

In additional example embodiments, the bistable beam may include frangible mounts or connections to the actuator, and/or the bistable beam may include frangible portions between various sections of the bistable beam. Responsive to a force applied to the bistable beam, e.g., if the bistable beam is caught or stuck on a portion of an environment, the frangible mounts of the bistable beam may decouple the bistable beam from the actuator, and/or the frangible portions of the bistable beam may separate sections of the bistable beam from each other. Further, the frangible mounts and/or frangible portions may be passively actuated and configured to decouple or separate responsive to the force applied to the bistable beam. Moreover, various types of actuators may be associated with the frangible mounts and/or frangible portions, e.g., heating elements, electromagnetic clamps, servos, solenoids, or other types of actuators, to cause decoupling of the bistable beam from the actuator, and/or to cause separation of sections of the bistable beam from each other. Furthermore, the force applied to the bistable beam may be detected using data associated with various types of sensors, e.g., actuator speed, actuator current, force or load sensors, stress/strain sensors, imaging devices, inertial measurement units, accelerometers, gyroscopes, magnetometers, or other types of sensors.

In further example embodiments, the bistable hook may include a housing, a plunger, a hook element operatively connected to the plunger, and a bias element. The plunger and hook element may be operatively connected via one or more linkage elements and/or linkage or pivot joints, such that displacement and/or acceleration of the plunger may cause a corresponding displacement, rotation, and/or acceleration of the hook element. In addition, the bias element may cause the plunger and hook element to move or be biased to either of the two substantially stable positions or configurations, e.g., either the closed position or the open position.

In some example embodiments in which the plunger is coupled to the second end of the bistable beam, each of displacement and acceleration of the plunger relative to the housing may cause corresponding displacement, rotation, and acceleration of the hook element between the closed position and the open position. In other example embodiments in which the housing is coupled to the second end of the bistable beam, substantially only acceleration of the plunger relative to the housing may cause corresponding rotation and acceleration of the hook element between the closed position and the open position. In further example embodiments, the bistable hook may include an actuator, e.g., a motor, servo, solenoid, or other type of actuator, configured to cause movement of the hook element between the closed position and the open position.

Furthermore, the bistable package delivery methods described herein may include extending the bistable beam and bistable hook carrying a package or object to a delivery location, and causing release of the package by the bistable hook at the delivery location. Then, it may be determined whether the package was successfully released based on forces applied to the bistable beam, and if not, release of the package may be attempted again. Upon successful release of the package, the methods may include retracting the bistable beam and bistable hook from the delivery location back to an aerial vehicle. During retraction of the bistable beam and bistable hook, the retraction may be controlled based on forces applied to the bistable beam, and/or navigation or operations of the aerial vehicle may be modified based on forces applied to the bistable beam. Further, if it is detected that the bistable beam and bistable hook are caught or stuck on a portion of the environment based on forces applied to the bistable beam, at least a portion of the bistable beam and the bistable hook may be decoupled or separated from the aerial vehicle via frangible mounts and/or frangible portions of the bistable beam. Various actuators and/or sensors described herein may be used to assist in the various steps of the bistable package delivery methods described herein.

Although the description herein generally relates to bistable package delivery systems and methods used in association with aerial vehicles, in other example embodiments, the bistable package delivery systems and methods may be used in association with various other types of vehicles, e.g., ground based vehicles, water based vehicles, or space based vehicles, and/or may be used in association with various other types of systems, machines, equipment, or apparatus.

FIG. 1 illustrates a schematic perspective view diagram of an aerial vehicle 100 with a ring wing that is substantially hexagonal in shape and that surrounds a plurality of propulsion mechanisms, in accordance with implementations of the present disclosure. The aerial vehicle 100 includes six propulsion mechanisms 102-1, 102-2, 102-3, 102-4, 102-5, and 102-6 spaced about the body or fuselage 110 of the aerial vehicle 100. While the propulsion mechanisms 102 may include motors 101-1, 101-2, 101-3, 101-4, 101-5, and 101-6 and propellers 104-1, 104-2, 104-3, 104-4, 104-5, and 104-6, in other implementations, other forms of propulsion may be utilized as the propulsion mechanisms 102. For example, one or more of the propulsion mechanisms 102 of the aerial vehicle 100 may utilize fans, jets, turbojets, turbo fans, jet engines, and/or the like to maneuver the aerial vehicle. Generally described, a propulsion mechanism 102, as used herein, includes any form of propulsion mechanism that is capable of generating a force sufficient to maneuver the aerial vehicle, alone and/or in combination with other propulsion mechanisms. Furthermore, in selected implementations, propulsion mechanisms (e.g., 102-1, 102-2, 102-3, 102-4, 102-5, and 102-6) may be configured such that their individual orientations may be dynamically modified (e.g., change from vertical to horizontal flight orientation or any position therebetween).

Likewise, while the examples herein describe the propulsion mechanisms being able to generate force in either direction, in some implementations, the propulsion mechanisms may only generate force in a single direction. However, the orientation of the propulsion mechanism may be adjusted so that the force can be oriented in a positive direction, a negative direction, and/or any other direction.

In this implementation, the aerial vehicle 100 also includes a ring wing 107 having a substantially hexagonal shape that extends around and forms the perimeter of the aerial vehicle 100. In the illustrated example, the ring wing has six sections or segments 107-1, 107-2, 107-3, 107-4, 107-5, and 107-6 that are joined at adjacent ends to form the ring wing 107 around the aerial vehicle 100. Each segment of the ring wing 107 has an airfoil shape to produce lift when the aerial vehicle is oriented as illustrated in FIG. 1 and moving in a direction that is substantially horizontal. As illustrated, and discussed further below, the ring wing is positioned at an angle with respect to the fuselage 110 such that the lower segment 107-2 of the ring wing acts as a front wing as it is toward the front of the aerial vehicle when oriented as shown and moving in a horizontal direction. The upper segment 107-1 of the ring wing, which has a longer chord length than the lower segment 107-2 of the ring wing 107, is farther back and thus acts as a rear wing.

The ring wing 107 is secured to the fuselage 110 by motor arms 105. In this example, all six motor arms 105-1, 105-2, 105-3, 105-4, 105-5, and 105-6 are coupled to the fuselage at one end, extend from the fuselage 110 and couple to the ring wing 107 at a second end, thereby securing the ring wing 107 to the fuselage 110. In other implementations, less than all of the motor arms may extend from the fuselage 110 and couple to the ring wing 107. For example, motor arms 105-2 and 105-5 may be coupled to the fuselage 110 at one end and extend outward from the fuselage but not couple to the ring wing 107.

In some implementations, the aerial vehicle may also include one or more stabilizer fins 120 that extend from the fuselage 110 to the ring wing 107. The stabilizer fin 120 may also have an airfoil shape. In the illustrated example, the stabilizer fin 120 extends vertically from the fuselage 110 to the ring wing 107. In other implementations, the stabilizer fin may be at other positions. For example, the stabilizer fin may extend downward from the fuselage between motor arm 105-1 and motor arm 105-6.

In general, one or more stabilizer fins may extend from the fuselage 110, between any two motor arms 105 and couple to an interior of the ring wing 107. For example, stabilizer fin 120 may extend upward between motor arms 105-3 and 105-4, a second stabilizer fin may extend from the fuselage and between motor arms 105-5 and 105-6, and a third stabilizer fin may extend from the fuselage and between motor arms 105-1 and 105-2.

Likewise, while the illustrated example shows the stabilizer fin extending from the fuselage 110 at one end and coupling to the interior of the ring wing 107 at a second end, in other implementations, one or more of the stabilizer fin(s) may extend from the fuselage and not couple to the ring wing or may extend from the ring wing and not couple to the fuselage. In some implementations, one or more stabilizer fins may extend from the exterior of the ring wing 107, one or more stabilizer fins may extend from the interior of the ring wing 107, one or more stabilizer fins may extend from the fuselage 110, and/or one or more stabilizer fins may extend from the fuselage 110 and couple to the interior of the ring wing 107.

The fuselage 110, motor arms 105, stabilizer fin 120, and ring wing 107 of the aerial vehicle 100 may be formed of any one or more suitable materials, such as graphite, carbon fiber, and/or aluminum.

Each of the propulsion mechanisms 102 are coupled to a respective motor arm 105 (or propulsion mechanism arm) such that the propulsion mechanism 102 is substantially contained within the perimeter of the ring wing 107. For example, propulsion mechanism 102-1 is coupled to motor arm 105-1, propulsion mechanism 102-2 is coupled to motor arm 105-2, propulsion mechanism 102-3 is coupled to motor arm 105-3, propulsion mechanism 102-4 is coupled to motor arm 105-4, propulsion mechanism 102-5 is coupled to motor arm 105-5, and propulsion mechanism 102-6 is coupled to motor arm 105-6. In the illustrated example, each propulsion mechanism 102-1, 102-2, 102-3, 102-4, 102-5, and 102-6 is coupled at an approximate mid-point of the respective motor arm 105-1, 105-2, 105-3, 105-4, 105-5, and 105-6 between the fuselage 110 and the ring wing 107. In other embodiments, some propulsion mechanisms 102 may be coupled toward an end of the respective motor arm 105. In other implementations, the propulsion mechanisms may be coupled at other locations along the motor arm. Likewise, in some implementations, some of the propulsion mechanisms may be coupled to a mid-point of the motor arm and some of the propulsion mechanisms may be coupled at other locations along respective motor arms (e.g., closer toward the fuselage 110 or closer toward the ring wing 107).

As illustrated, the propulsion mechanisms 102 may be oriented at different angles with respect to each other. For example, propulsion mechanisms 102-2 and 102-5 are aligned with the fuselage 110 such that the force generated by each of propulsion mechanisms 102-2 and 102-5 is in-line or in the same direction or orientation as the fuselage. In the illustrated example, the aerial vehicle 100 is oriented for horizontal flight such that the fuselage is oriented horizontally in the direction of travel. In such an orientation, the propulsion mechanisms 102-2 and 102-5 provide horizontal forces, also referred to herein as thrusting forces and act as thrusting propulsion mechanisms.

In comparison to propulsion mechanisms 102-2 and 102-5, each of propulsion mechanisms 102-1, 102-3, 102-4, and 102-6 are offset or angled with respect to the orientation of the fuselage 110. When the aerial vehicle 100 is oriented horizontally as shown in FIG. 1 for horizontal flight, the propulsion mechanisms 102-1, 102-3, 102-4, and 102-6 may be used as propulsion mechanisms, providing thrust in a non-horizontal direction to cause the aerial vehicle to pitch, yaw, roll, heave and/or sway. In other implementations, during horizontal flight, the propulsion mechanisms 102-1, 102-3, 102-4, and 102-6 may be disabled such that they do not produce any forces and the aerial vehicle 100 may be propelled aerially in a horizontal direction as a result of the lifting force from the aerodynamic shape of the ring wing 107 and the horizontal thrust produced by the thrusting propulsion mechanisms 102-2 and 102-5.

In some implementations, one or more segments of the ring wing 107 may include ailerons, control surfaces, and/or trim tabs 109 that may be adjusted to control the aerial flight of the aerial vehicle 100. For example, one or more ailerons, control surfaces, and/or trim tabs 109 may be included on the upper segment 107-1 of the ring wing 107 and/or one or more ailerons, control surfaces, and/or trim tabs 109 may be included on the side segments 107-4 and/or 107-3. Further, one or more ailerons, control surfaces, and/or trim tabs 109 may also be included on one or more of the remaining segments 107-2, 107-5, and 107-6. The ailerons, control surfaces, and/or trim tabs 109 may be operable to control the pitch, yaw, and/or roll of the aerial vehicle during horizontal flight when the aerial vehicle 100 is oriented as illustrated in FIG. 1.

The angle of orientation of each of the propulsion mechanisms 102-1, 102-2, 102-3, 102-4, 102-5, and 102-6 may vary for different implementations. Likewise, in some implementations, the offset of the propulsion mechanisms 102-1, 102-2, 102-3, 102-4, 102-5, and 102-6 may each be the same, with some oriented in one direction and some oriented in another direction, may each be oriented different amounts, and/or in different directions.

In the illustrated example of FIG. 1, each propulsion mechanism 102-1, 102-2, 102-3, 102-4, 102-5, and 102-6 may be oriented approximately thirty degrees with respect to the position of each respective motor arm 105-1, 105-2, 105-3, 105-4, 105-5, and 105-6. In addition, the direction of orientation of the propulsion mechanisms is such that pairs of propulsion mechanisms are oriented toward one another. For example, propulsion mechanism 102-1 is oriented approximately thirty degrees toward propulsion mechanism 102-6. Likewise, propulsion mechanism 102-2 is oriented approximately thirty degrees in a second direction about the second motor arm 105-2 and oriented toward propulsion mechanism 102-3. Finally, propulsion mechanism 102-4 is oriented approximately thirty degrees in the first direction about the fourth motor arm 105-4 and toward propulsion 102-5. As illustrated, propulsion mechanisms 102-2 and 102-5, which are on opposing sides of the fuselage 110, are aligned and oriented in a same first direction (in this example, horizontal). Propulsion mechanisms 102-3 and 102-6, which are on opposing sides of the fuselage 110, are aligned and oriented in a same second direction, which is angled compared to the first direction. Propulsion mechanisms 102-1 and 102-4, which are on opposing sides of the fuselage 110, are aligned and oriented in a same third direction, which is angled compared to the first direction and the second direction.

Figure 2:
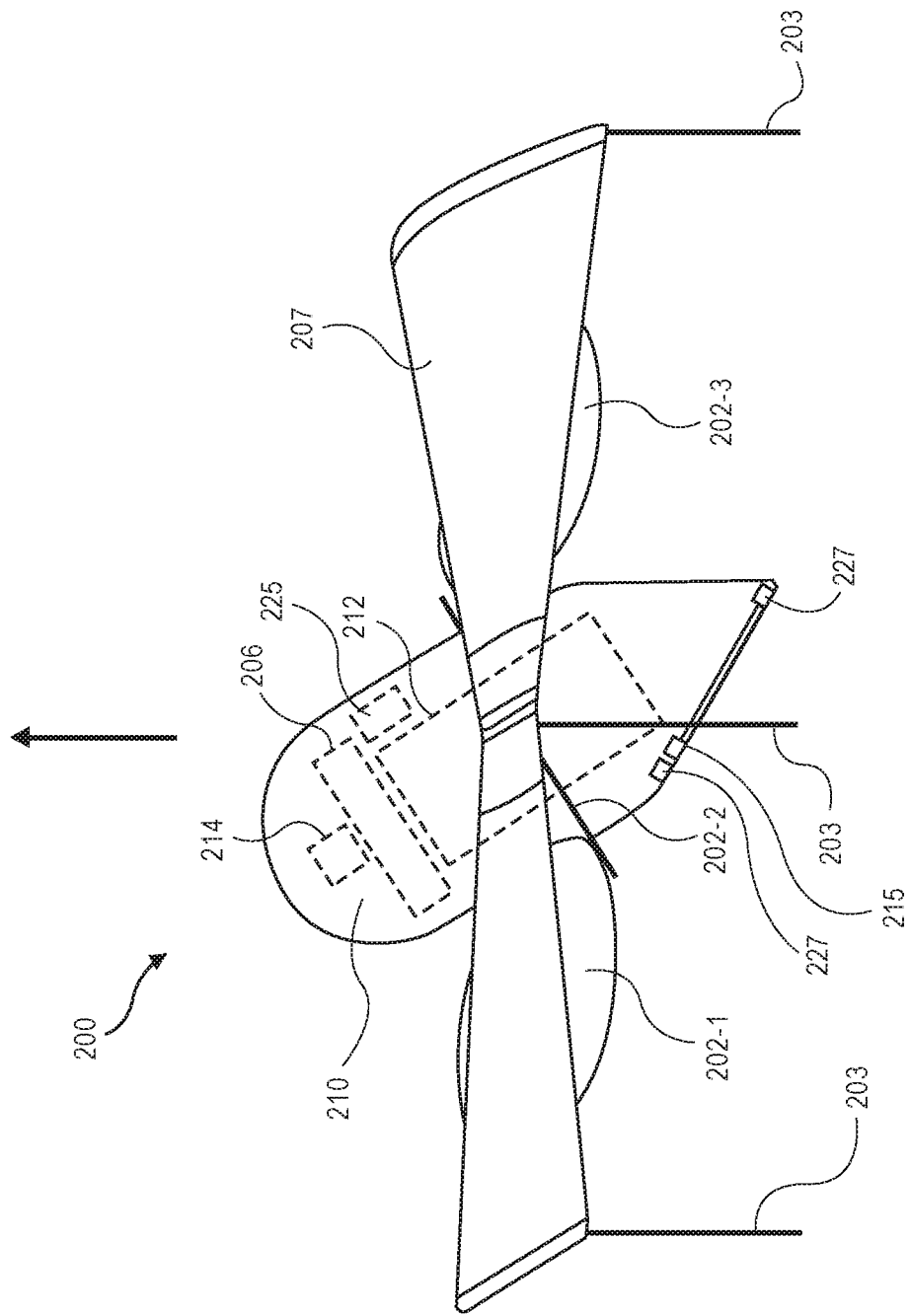
FIG. 2 is a schematic side view diagram of the aerial vehicle of FIG. 1 oriented for vertical takeoff and landing (VTOL) having an example bistable package delivery system, in accordance with implementations of the present disclosure.

FIG. 2 is a schematic side view diagram of the aerial vehicle of FIG. 1 oriented for vertical takeoff and landing (VTOL) having an example bistable package delivery system, in accordance with implementations of the present disclosure. The aerial vehicle 200 corresponds to the aerial vehicle 100 discussed above with respect to FIG. 1. When oriented as illustrated in FIG. 2, the aerial vehicle may maneuver in any of the six degrees of freedom (pitch, yaw, roll, heave, surge, and sway), thereby enabling VTOL and high maneuverability.

As illustrated, when the aerial vehicle is oriented for VTOL, the motor arms and the ring wing 207 are aligned approximately horizontally and in the same plane. In this orientation, each of the propulsion mechanisms are offset or angled with respect to the horizontal and/or vertical direction. As such, each propulsion mechanism 202, when generating a force, generates a force that includes both a horizontal component and a vertical component. In the illustrated example, each propulsion mechanism is angled approximately thirty degrees with respect to vertical. Likewise, as discussed above, adjacent propulsion mechanisms are angled in opposing directions to form pairs of propulsion mechanisms. For example, propulsion mechanism 202-2 is oriented toward propulsion mechanism 202-3. As discussed further below, angling adjacent propulsion mechanisms toward one another to form pairs of propulsion mechanisms allows horizontal forces from each propulsion mechanism to cancel out such that the pair of propulsion mechanisms can produce a net vertical force. Likewise, if one of the propulsion mechanisms of a pair of propulsion mechanisms is producing a larger force than the other propulsion mechanism of the pair, a net horizontal force will result from the pair of propulsion mechanisms. Accordingly, when the aerial vehicle 200 is oriented for VTOL with angled propulsion mechanisms, as illustrated in FIG. 2, the aerial vehicle can move independently in any of the six degrees of freedom. For example, if the aerial vehicle is to surge in the X direction, it can do so by altering the forces produced by the propulsion mechanisms to generate a net horizontal force in the X direction without having to pitch forward to enable a surge in the X direction.

To enable the fuselage to be oriented horizontally with an offset ring wing 207 during horizontal flight, as illustrated in FIG. 1, the fuselage is rotated at an angle when the aerial vehicle 200 is oriented for VTOL, as illustrated in FIG. 2. In this example the body or fuselage 210 is angled at approximately thirty degrees from vertical. In other implementations, the amount of rotation from vertical may be greater or less depending on the amount of offset desired for the ring wing 207 when the aerial vehicle 200 is oriented for horizontal flight.

The aerial vehicle may also include one or more landing gears 203 that are extendable to a landing position, as illustrated in FIG. 2. During flight, the landing gear 203 may be retracted into the interior of the ring wing 207 and/or may be rotated up and remain along the trailing edge of the ring wing. In still other examples, the landing gear may be permanently affixed.

The fuselage 210 may be used to house or store one or more components of the aerial vehicle, such as the aerial vehicle control system 214, a power module 206, and/or a package 212 that is transported by the aerial vehicle. In addition, the fuselage 210 may also include a package door 215, a bistable package delivery system 225 configured to couple, raise, carry, transport, lower, and release the package 212, and one or more sensors 227 to assist with operations of the aerial vehicle 200 and the bistable package delivery system 225. The aerial vehicle control system 214 is discussed further below at least with respect to FIG. 11. The power module(s) 206 may be removably mounted to the aerial vehicle 200. The power module(s) 206 for the aerial vehicle may be, for example, in the form of battery power, solar power, gas power, super capacitor, fuel cell, alternative power generation source, or a combination thereof. The power module(s) 206 are coupled to and provide power for the aerial vehicle control system 214, the propulsion mechanisms 202, the package door 215, the bistable package delivery system 225, and the one or more sensors 227.

In some implementations, one or more of the power modules may be configured such that it can be autonomously removed and/or replaced with another power module. For example, when the aerial vehicle lands at a delivery location, relay location and/or materials handling facility, the aerial vehicle may engage with a charging member at the location that will recharge the power module.

The package 212 may be any object or payload that is to be transported by the aerial vehicle. In some implementations, the aerial vehicle may be used to aerially deliver items ordered by customers for aerial delivery, and the package may include one or more customer ordered items. For example, a customer may order an item from an electronic commerce website and the item may be delivered to a customer specified delivery location using the aerial vehicle 200. In example embodiments, the package 212 may be shaped as a substantially rectangular prism, such as a box, container, crate, or other package.

In example implementations, the bistable package delivery system 225 that is coupled to a portion of the fuselage 210 may include a bistable beam, an actuator configured to move the bistable beam between a reeled position and an extended position, and a bistable hook coupled to an end of the bistable beam, in which the bistable hook is configured to move between a closed position and an open position. Further details of the bistable package delivery system 225 are discussed herein.

By use of the bistable package delivery systems and methods described herein, an object or package may be delivered to a delivery destination from a short height, such that the aerial vehicle does not need to land and may maintain a safe distance from portions of the environment. In addition, the object or package may be controllably and reliably delivered without damage to the object or portions of the environment by extending the bistable beam and bistable hook carrying the object, releasing the object by the bistable hook, and retracting the bistable beam and bistable hook back to the aerial vehicle, in which the bistable beam and bistable hook may safely and reliably avoid tangling of the beam, prevent ensnarement of the beam or hook by propulsion mechanisms, and minimize destabilization of the aerial vehicle during delivery operations.

Although FIGS. 1 and 2 illustrate a particular type, configuration, or arrangement of an aerial vehicle having an example bistable package delivery system, in other example embodiments, aerial vehicles of various other types, configurations, or arrangements may utilize the example bistable package delivery systems and methods described herein. For example, other types, configurations, or arrangements of aerial vehicles may have various different types, numbers, or arrangements of a body or fuselage, propulsion mechanisms, propulsion mechanism arms, wings, stabilizers, control surfaces, sensors, controllers, components, or other aspects, as well as various other shapes, sizes, operational modes, object or package capacities, or others.

Figure 3A:
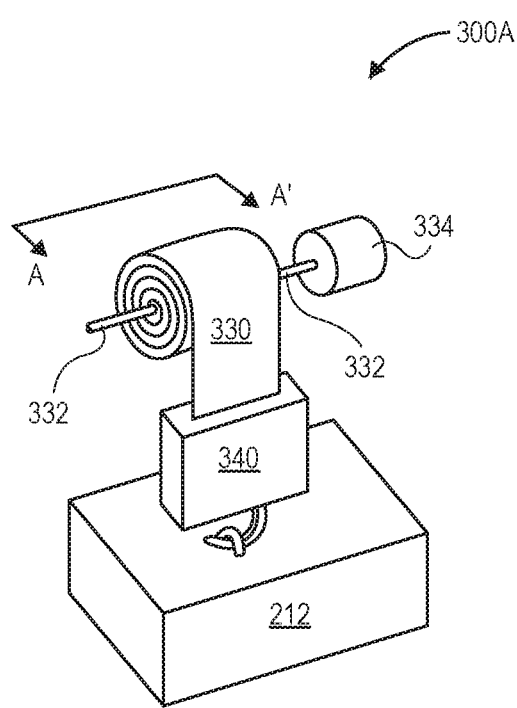
FIG. 3A is a schematic perspective view diagram of an example bistable package delivery system in a retracted state, in accordance with implementations of the present disclosure.
Figure 3B:
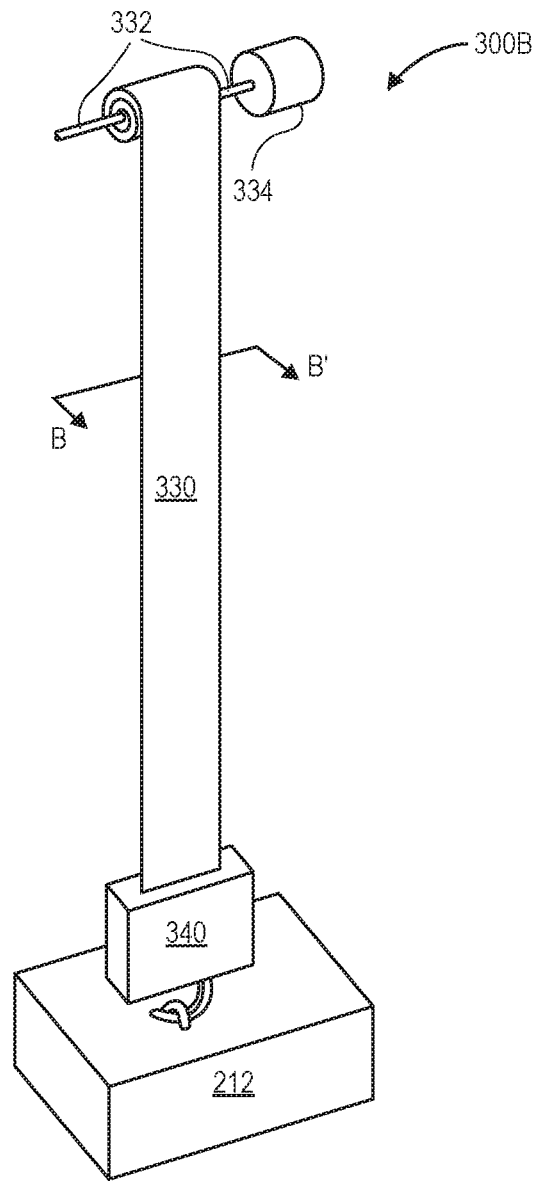
FIG. 3B is a schematic perspective view diagram of an example bistable package delivery system in an extended state, in accordance with implementations of the present disclosure.

FIG. 3A is a schematic perspective view diagram 300A of an example bistable package delivery system in a retracted state, in accordance with implementations of the present disclosure. FIG. 3B is a schematic perspective view diagram 300B of an example bistable package delivery system in an extended state, in accordance with implementations of the present disclosure. As shown in FIGS. 3A and 3B, the example bistable package delivery system coupled to a package 212 may be an example of the bistable package delivery system 225 schematically illustrated and described with respect to FIG. 2.

The bistable package delivery system may include a bistable beam 330 having two substantially stable positions or configurations. As shown in FIG. 3A, in a first stable position, the bistable beam 330 may be in a substantially retracted, reeled in, or rolled up state, position, or configuration. As shown in FIG. 3B, in a second stable position, the bistable beam 330 may be in a substantially extended, unreeled, or unrolled state, position, or configuration. The bistable beam 330 may be formed of various materials, such as composites, carbon fiber, metals, plastics, other materials, or combinations thereof.

Figure 4B:
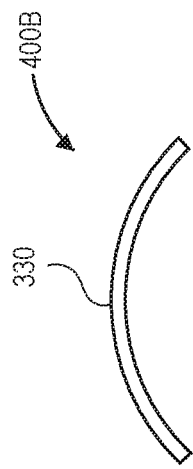
FIG. 4B is a schematic cross-sectional view diagram of an example bistable beam in an extended state, shown along lines B-B' shown in FIG. 3B, in accordance with implementations of the present disclosure.
Figure 4C:
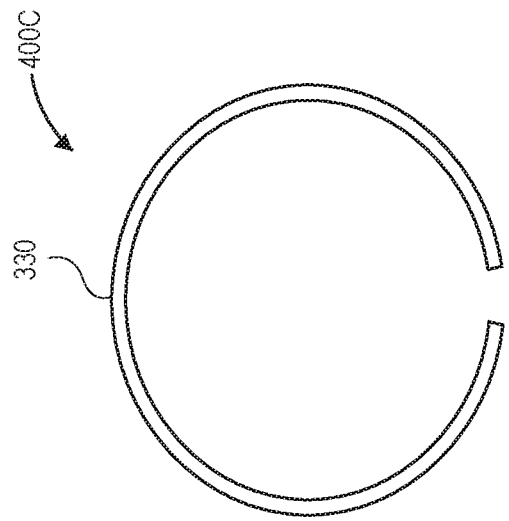
FIG. 4C is a schematic cross-sectional view diagram of another example bistable beam in an extended state, shown along lines B-B' shown in FIG. 3B, in accordance with implementations of the present disclosure.
Figure 4A:
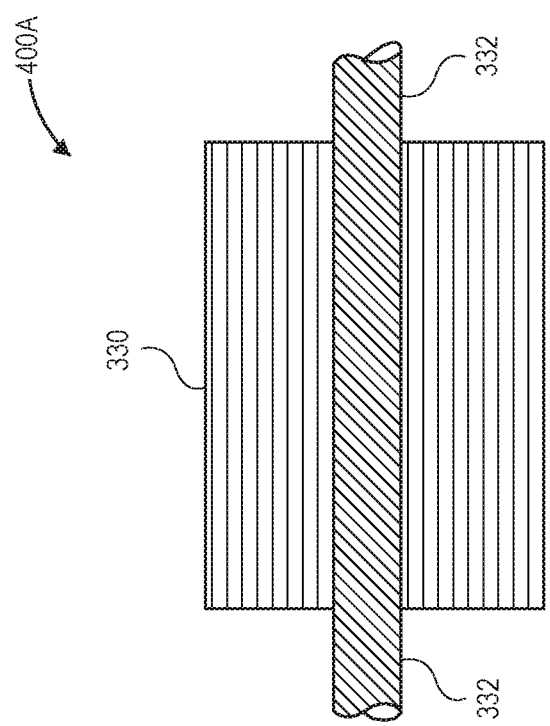
FIG. 4A is a schematic cross-sectional view diagram of an example bistable beam in a retracted state, shown along lines A-A' shown in FIG. 3A, in accordance with implementations of the present disclosure.

FIG. 4A is a schematic cross-sectional view diagram 400A of an example bistable beam in a retracted state, shown along lines A-A' shown in FIG. 3A, in accordance with implementations of the present disclosure. As shown in FIG. 4A, the bistable beam 330 in the reeled in or rolled up position may have a substantially flat cross-sectional shape.

FIG. 4B is a schematic cross-sectional view diagram 400B of an example bistable beam in an extended state, shown along lines B-B' shown in FIG. 3B, in accordance with implementations of the present disclosure. As shown in FIG. 4B, the bistable beam 330 in the extended or unrolled position may have an at least partially curved cross-sectional shape, such as a partial curve or arc shape.

FIG. 4C is a schematic cross-sectional view diagram 400C of another example bistable beam in an extended state, shown along lines B-B' shown in FIG. 3B, in accordance with implementations of the present disclosure. As shown in FIG. 4C, the bistable beam 330 in the extended or unrolled position may have an at least partially curved cross-sectional shape, such as a tubular or circular shape.

In addition, the bistable beam 330 may be coupled to a shaft or connection 332 that is rotated by an actuator 334. The actuator 334 may comprise various types of actuators, such as motors, servos, or other rotary actuators. The connection 332 may comprise a shaft, pin, rod, or other element that is coupled to and rotated by the actuator 334, and the connection 332 may be formed of various materials, such as composites, metals, plastics, other materials, or combinations thereof. The bistable beam 330 may be retracted and extended between the reeled position and the extended position responsive to rotation of the shaft or connection 332 by the actuator 334.

Further, an end of the bistable beam 330 may be coupled to a bistable hook 340, which may be coupled to an object or package 212. As described herein, the bistable hook 340 may also have two substantially stable positions or configurations, including a closed position and an open position. In the closed position, the bistable hook may couple to and carry an object or package 212. In the open position, the bistable hook may release the object or package 212. The bistable hook 340 is described in more detail at least with respect to FIGS. 7A-8B.

Figure 5:
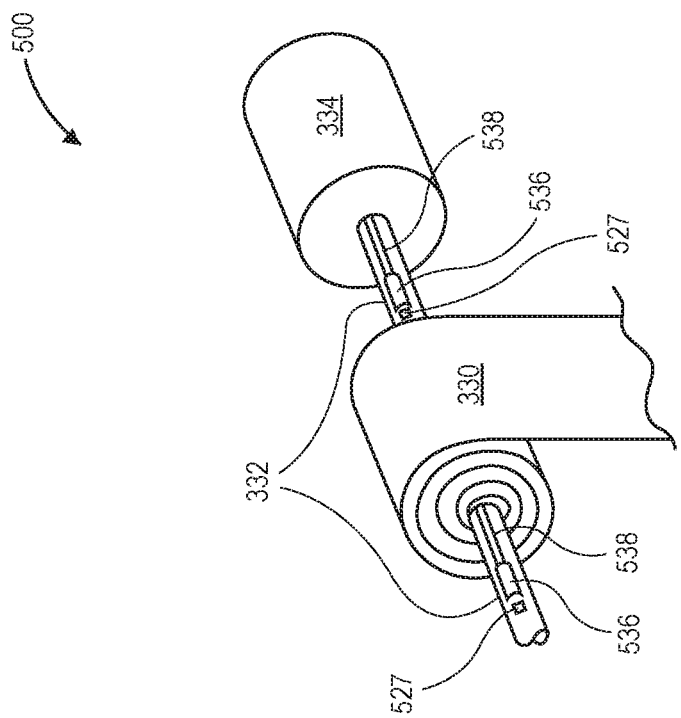
FIG. 5 is a schematic perspective view diagram of an example bistable package delivery system having frangible mounts, in accordance with implementations of the present disclosure.

FIG. 5 is a schematic perspective view diagram 500 of an example bistable package delivery system having frangible mounts, in accordance with implementations of the present disclosure. As shown in FIG. 5, the example bistable package delivery system may be an example of a portion of the bistable package delivery system schematically illustrated and described at least with respect to FIGS. 2-4C.

For example, the shaft or connection 332 to which the bistable beam 330 is coupled may be frangible, releasable, or breakable. The frangible connection 332 may decouple the bistable beam 330 from the actuator 334 in a passive or active manner. In some example embodiments, responsive to applying a force or load to the bistable beam that exceeds a threshold, the frangible connection 332 may decouple the bistable beam 330 from the actuator 334. The frangible connection 332 may comprise a shaft, pin, rod, or other element that is coupled to and rotated by the actuator 334, and the frangible connection 332 may be formed of various materials, such as composites, metals, plastics, nylon, other materials, or combinations thereof.

In example embodiments in which the frangible connection 332 is passive, the frangible connection 332 may be designed or configured to withstand a force or load applied to the bistable beam approximately up to a threshold force or load. Responsive to exceeding the threshold force or load, the frangible connection 332 may release or break to decouple the bistable beam 330 from the actuator 334. For example, the material of the frangible connection 332 may break or fracture, or a joint or attachment between the frangible connection 332 and the actuator 334 may release or disconnect, responsive to exceeding the threshold force or load.

In example embodiments in which the frangible connection 332 is active, one or more sensors 227, 527 may receive data associated with forces or loads applied to the bistable beam 330. Responsive to exceeding the threshold force or load, the frangible connection 332 may be melted, released, or disconnected using one or more actuators or active elements 536, which may receive power and/or instructions via one or more power and/or communication lines 538.

The data associated with forces or loads applied to the bistable beam may include data associated with the actuator 334, such as motor speed, motor current, or other data related to operation of the actuator 334. For example, an actual motor speed less than an instructed motor speed may indicate additional force or load applied to the bistable beam. Likewise, an actual motor current greater than an instructed motor current may indicate additional force or load applied to the bistable beam.

The one or more sensors 227, 527 may include imaging devices, force or load sensors, stress/strain sensors, navigation sensors of the aerial vehicle such as inertial measurement units, accelerometers, gyroscopes, or magnetometers, and/or other types of sensors to detect data associated with forces or loads applied to the bistable beam 330. For example, data from an imaging device 227 may be processed to determine that the bistable beam 330 is caught or stuck on an object or portion of the environment, which may be associated with forces or loads applied to the bistable beam.

In addition, data from force or load sensors and/or stress/strain sensors 527 associated with the bistable beam 330 and/or the frangible connection 332 may be processed to determine forces or loads applied to the bistable beam. Further, data from aerial vehicle navigation sensors may be processed to determine changes to position, orientation, flight dynamics, or other aspects of operations of the aerial vehicle, which may be associated with forces or loads applied to the bistable beam.

Responsive to determining that the threshold force or load is exceeded based on data associated with the actuator 334 and/or data from one or more sensors 227, 527, the frangible connection 332 may be melted, released, or disconnected using one or more actuators 536, which may receive power and/or instructions via one or more power and/or communication lines 538.

The one or more actuators or active elements 536 may comprise heating elements, electromagnetic clamps, servos, solenoids, or other types of actuators. For electromagnetic clamps, servos, and/or solenoids, responsive to exceeding the threshold force or load, the frangible connection 332 may be released or disconnected from the actuator 334 by actuating the clamps, servos, and/or solenoids, thereby releasing the bistable beam 330 and/or a portion of the frangible connection 332 from the actuator 334.

As shown in the example of FIG. 5, the frangible connection 332 may be formed of nylon or other plastics, and the actuators 536 may comprise heating elements configured to receive current from a power source via the power and/or communication lines 538. Responsive to determining that the force or load applied to the bistable beam 330 exceeds the threshold force or load, e.g., using data from one or more sensors 227, 527 and/or data associated with the actuator 334, the heating elements may receive current such that the frangible connection 332 is melted by application of heat, thereby decoupling and releasing the bistable beam 330 and/or a portion of the frangible connection 332 from the actuator 334.

Although the frangible connections are generally described herein in the context of connections between an actuator and a bistable beam, in other example embodiments, frangible connections may be included between other portions of the bistable package delivery system, and/or between the bistable package delivery system and portions of a vehicle. For example, the connection between the bistable beam and the bistable hook may be frangible, releasable, or breakable, and/or one or more components of the bistable hook may be frangible, releasable, or breakable. In other example embodiments, the bistable beam, associated actuator, and bistable hook may be coupled to a vehicle, e.g., an aerial vehicle, via one or more frangible connections, such that substantially all components of the bistable package delivery system may be released, disconnected, or separated from the vehicle.

Figure 6:
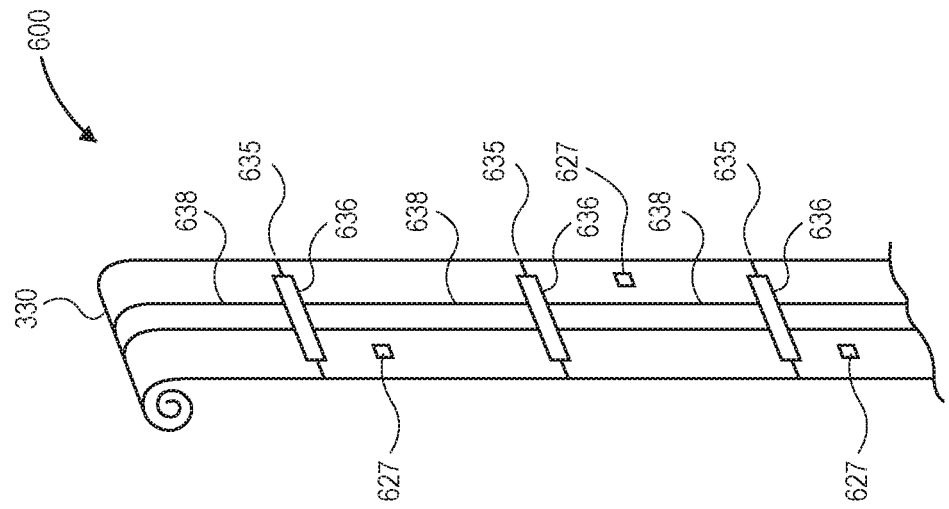
FIG. 6 is a schematic perspective view diagram of an example bistable beam having frangible sections, in accordance with implementations of the present disclosure.

FIG. 6 is a schematic perspective view diagram 600 of an example bistable beam having frangible sections, in accordance with implementations of the present disclosure. As shown in FIG. 6, the example bistable beam may be an example of a portion of the bistable package delivery system schematically illustrated and described at least with respect to FIGS. 2-5.

For example, the bistable beam 330 may include one or more frangible, releasable, or breakable portions 635. The frangible portions 635 may decouple sections of the bistable beam 330 from each other in a passive or active manner. In some example embodiments, responsive to applying a force or load to the bistable beam that exceeds a threshold, the frangible portions 635 may decouple sections of the bistable beam 330 from each other. In further example embodiments, various different frangible portions 635 of a bistable beam 330 may have different associated force or load thresholds, such that different sections of the bistable beam 330 may decouple from other sections at the different associated force or load thresholds. The frangible portions 635 may be formed of the same or different materials as other sections of the bistable beam 330, and/or may be formed of various materials, such as composites, carbon fiber, metals, plastics, other materials, or combinations thereof.

In example embodiments in which the frangible portions 635 are passive, the frangible portions 635 may be designed or configured to withstand a force or load applied to the bistable beam approximately up to a threshold force or load. Responsive to exceeding the threshold force or load, the frangible portions 635 may release or break to decouple sections of the bistable beam 330 from each other. For example, the material of the frangible portions 635 may break or fracture, or a joint or attachment associated with the frangible portions 635 between sections of the bistable beam 330 may release or disconnect, responsive to exceeding the threshold force or load.

In example embodiments in which the frangible portions 635 are active, one or more sensors 227, 627 may receive data associated with forces or loads applied to the bistable beam 330. Responsive to exceeding the threshold force or load, the frangible portions 635 may be melted, released, or disconnected using one or more actuators or active elements 636, which may receive power and/or instructions via one or more power and/or communication lines 638.

The data associated with forces or loads applied to the bistable beam may include data associated with the actuator 334, such as motor speed, motor current, or other data related to operation of the actuator 334. For example, an actual motor speed less than an instructed motor speed may indicate additional force or load applied to the bistable beam. Likewise, an actual motor current greater than an instructed motor current may indicate additional force or load applied to the bistable beam.

The one or more sensors 227, 627 may include imaging devices, force or load sensors, stress/strain sensors, navigation sensors of the aerial vehicle such as inertial measurement units, accelerometers, gyroscopes, or magnetometers, and/or other types of sensors to detect data associated with forces or loads applied to the bistable beam 330. For example, data from an imaging device 227 may be processed to determine that the bistable beam 330 is caught or stuck on an object or portion of the environment, which may be associated with forces or loads applied to the bistable beam. In addition, data from force or load sensors and/or stress/strain sensors 627 associated with the bistable beam 330 and/or the frangible portions 635 may be processed to determine forces or loads applied to the bistable beam. Further, data from aerial vehicle navigation sensors may be processed to determine changes to position, orientation, flight dynamics, or other aspects of operations of the aerial vehicle, which may be associated with forces or loads applied to the bistable beam.

Responsive to determining that the threshold force or load is exceeded based on data associated with the actuator 334 and/or data from one or more sensors 227, 627, the frangible portions 635 may be melted, released, or disconnected using one or more actuators 636, which may receive power and/or instructions via one or more power and/or communication lines 638.

The one or more actuators or active elements 636 may comprise heating elements, electromagnetic clamps, servos, solenoids, or other types of actuators. For electromagnetic clamps, servos, and/or solenoids, responsive to exceeding the threshold force or load, the actuators 636 may release, disconnect, or separate sections of the bistable beam 330 from each other by actuating the clamps, servos, and/or solenoids, thereby releasing sections of the bistable beam 330 from each other.

As shown in the example of FIG. 6, the frangible portions 635 may be at least partially formed of nylon or other plastics, and the actuators 636 may comprise heating elements configured to receive current from a power source via the power and/or communication lines 638. Responsive to determining that the force or load applied to the bistable beam 330 exceeds the threshold force or load, e.g., using data from one or more sensors 227, 627 and/or data associated with the actuator 334, the heating elements may receive current such that the frangible portions 635 are melted by application of heat, thereby decoupling and releasing sections of the bistable beam 330 from each other.

Figure 7A:
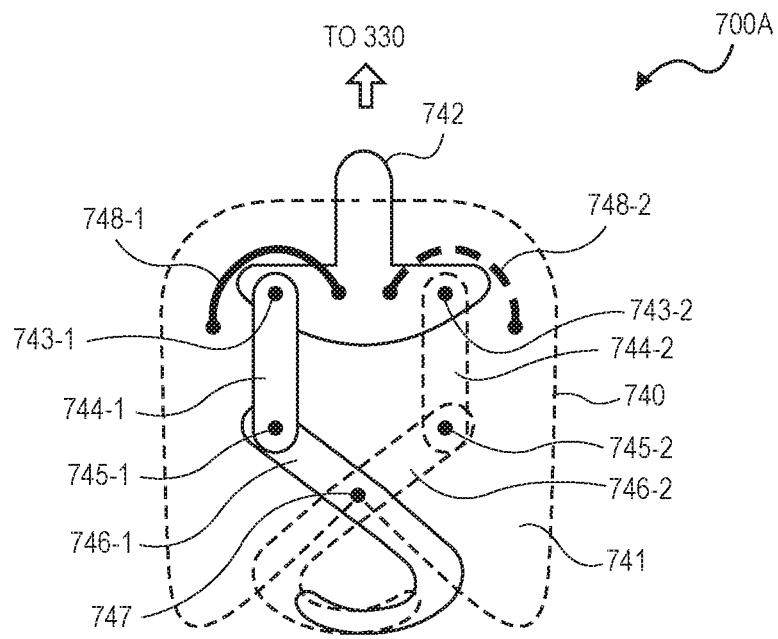
FIG. 7A is a schematic side view diagram of an example bistable hook in a closed position, in accordance with implementations of the present disclosure.
Figure 7B:
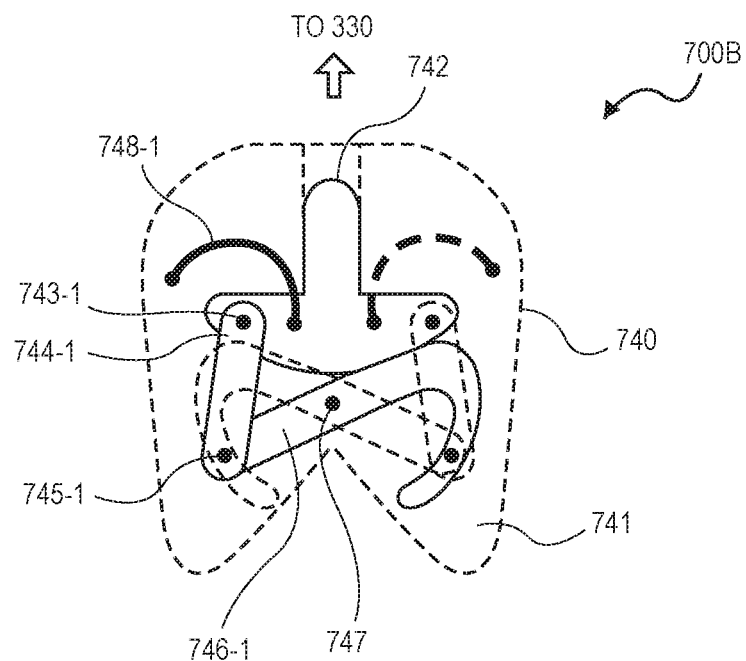
FIG. 7B is a schematic side view diagram of an example bistable hook in an open position, in accordance with implementations of the present disclosure.

FIG. 7A is a schematic side view diagram 700A of an example bistable hook in a closed position, in accordance with implementations of the present disclosure. FIG. 7B is a schematic side view diagram 700B of an example bistable hook in an open position, in accordance with implementations of the present disclosure. As shown in FIGS. 7A and 7B, the example bistable hook 740 may be an example of the bistable hook 340 schematically illustrated and described at least with respect to FIGS. 3A and 3B.

The bistable package delivery system may include a bistable hook 740 having two substantially stable positions or configurations. As shown in FIG. 7A, in a first stable position, the bistable hook 740 may be in a substantially closed state, position, or configuration to couple to and/or carry an object or package. As shown in FIG. 7B, in a second stable position, the bistable hook 740 may be in a substantially open state, position, or configuration to uncouple from and/or release an object or package. The bistable hook 740, and various components described herein, may be formed of various materials, such as composites, carbon fiber, metals, plastics, other materials, or combinations thereof.

In addition, the bistable hook 740, or various components thereof, may be connected to an end of the bistable beam 330. Movement of the bistable beam 330 between the retracted and extended positions may also cause raising and lowering of the bistable hook 740 that is coupled to an end of the bistable beam 330.

In the example embodiment of FIGS. 7A and 7B, the bistable hook 740 may include a housing 741, a plunger 742, one or more linkage elements 744, one or more hook elements 746, one or more bias elements 748, and various linkage or pivot joints 743, 745, 747 between the various components. The housing 741 may substantially surround or encompass all components of the bistable hook 740, except for portions of the plunger 742 and/or the hook elements 746.

The plunger 742 may be configured to move vertically, as shown in FIGS. 7A and 7B, relative to the housing 741 between two stable positions. The plunger 742 may be connected to respective first ends of one or more linkage elements 744-1, 744-2 via respective linkage joints 743-1, 743-2. In addition, the one or more linkage elements 744-1, 744-2 may be connected at respective second ends to respective first ends of one or more hook elements 746-1, 746-2 via respective linkage joints 745-1, 745-2. Further, the one or more hook elements 746-1, 746-2 may be pivotally or rotatably connected to the housing 741 via a pivot joint 747, and respective second ends of the one or more hook elements 746-1, 746-2 may be configured to couple to, carry, decouple from, and release an object or package.

Further, the one or more bias elements 748-1, 748-2 may be coupled between respective portions of the housing 741 and respective portions of the plunger 742. The one or more bias elements 748-1, 748-2 may comprise spring steel or other flexible, resilient, or compressible materials configured to apply a bias force to the plunger 742, such that the plunger 742 is biased towards either of the two stable positions shown in FIGS. 7A and 7B. For example, during movement of the plunger 742 vertically relative to the housing 741 away from a first stable position and toward a second stable position, the bias elements 748-1, 748-2 may be compressed for a portion of the movement up to a maximum compression point, and then with continuing movement of the plunger 742 relative to the housing 741 away from the first stable position and toward the second stable position, the bias elements 748-1, 748-2 may be decompressed for a portion of the movement. As a result, on either side of the maximum compression point, the bias elements 748-1, 748-2 may bias the plunger 742 to respective stable positions, which correspond to either of the closed or open positions of the bistable hook 740.

As shown in FIG. 7A, the plunger 742 may be in a first stable position, e.g., moved vertically upward relative to the housing 741. The bias elements 748 may apply a bias force to the plunger 742 to maintain the plunger in the first stable position. The linkage elements 744 that are coupled to the plunger 742 via linkage joints 743 may correspondingly move vertically upward. In addition, the hook elements 746 that are coupled to the linkage elements 744 via linkage joints 745 may correspondingly rotate around pivot joint 747, such that the hook elements 746 are in a closed position.

In contrast, as shown in FIG. 7B, the plunger 742 may be in a second stable position, e.g., moved vertically downward relative to the housing 741. The bias elements 748 may apply a bias force to the plunger 742 to maintain the plunger in the second stable position. The linkage elements 744 that are coupled to the plunger 742 via linkage joints 743 may correspondingly move vertically downward. In addition, the hook elements 746 that are coupled to the linkage elements 744 via linkage joints 745 may correspondingly rotate around pivot joint 747, such that the hook elements 746 are in an open position.

Although FIGS. 7A and 7B show a pair of linkage elements 744-1, 744-2, a pair of hook elements 746-1, 746-2, a pair of bias elements 748-1, 748-2, and pairs of linkage joints 743-1, 743-2, 745-1, 745-2, other example embodiments of the bistable hook 740 may include other numbers, configurations, or arrangements of the various components of a bistable hook. For example, an example embodiment of the bistable hook 740 may include only one linkage element 744-1, only one hook element 746-1, only one bias element 748-1, only one linkage joint 743-1, and only one linkage joint 745-1. In addition, other example embodiments of the bistable hook 740 may include other numbers, configurations, or arrangements of plungers, linkage elements, hook elements, bias elements, and/or linkage or pivot joints.

The bistable hook 740 may move between the closed position and the open position in an active or passive manner. In example embodiments in which movement of the bistable hook 740 is active, one or more actuators may be instructed to move the plunger 742 between the two stable positions to move the bistable hook 740 between the closed and open positions. The one or more actuators may comprise motors, servos, solenoids, linear actuators, or other types of actuators, and may receive power and/or instructions via one or more power and/or communication lines, such as power and/or communication lines 638 that extend along bistable beam 330 to the bistable hook 740.

In example embodiments in which movement of the bistable hook 740 is passive, the bistable hook 740 may be designed or configured to move between the closed and open positions based on at least one of relative displacement or relative acceleration between the plunger 742 and the housing 741. In one example embodiment, an end of the bistable beam 330 may be coupled to an upper end of the plunger 742 of the bistable hook 740. Initially, the bistable hook 740 may be coupled to an object or package and may be in the closed position, as shown in FIG. 7A. During extension of the bistable beam 330 to lower the bistable hook 740 carrying the object, the plunger 742 may not experience any, or may experience only minimal, displacement and/or acceleration relative to the housing 741, such that the bias elements 748 maintain the bistable hook 740 in the closed position, as shown in FIG. 7A. Upon contacting the ground, e.g., upon the object carried by the bistable hook 740 contacting the ground or a portion of the bistable hook 740 contacting the ground, the plunger 742 may experience displacement and/or acceleration relative to the housing 741, e.g., displacement and/or acceleration above respective thresholds, such that the plunger 742 moves vertically past the maximum compression point associated with the bias elements 748, and then biases the bistable hook 740 in the open position, as shown in FIG. 7B.

In another example embodiment, an end of the bistable beam 330 may be coupled to an upper end of the housing 741, but not to an upper end of the plunger 742, of the bistable hook 740. Initially, the bistable hook 740 may be coupled to an object or package and may be in the closed position, as shown in FIG. 7A. During extension of the bistable beam 330 to lower the bistable hook 740 carrying the object, the plunger 742 may not experience any, or may experience only minimal, acceleration relative to the housing 741, such that the bias elements 748 maintain the bistable hook 740 in the closed position, as shown in FIG. 7A. Upon slowing or stopping the extension of the bistable beam 330 and/or upon contacting the ground, e.g., upon the object carried by the bistable hook 740 contacting the ground or a portion of the bistable hook 740 contacting the ground, the plunger 742 may experience acceleration relative to the housing 741, e.g., acceleration above a respective threshold, such that the plunger 742 moves vertically past the maximum compression point associated with the bias elements 748, and then biases the bistable hook 740 in the open position, as shown in FIG. 7B.

In some example embodiments, in order to couple an object or package to one or more hook elements 746 of the bistable hook 740, the hook elements may attach or couple to loops, bars, handles, or other similar structures on the object or package. In other example embodiments, in order to couple an object or package to two or more hook elements 746 of the bistable hook 740, the hook elements may include an associated net, mesh, string, or line to carry or couple to the object or package. For example, the net, mesh, string, or line may be fixedly coupled to a first hook element, and may be removably coupled to a second hook element, e.g., via a loop or catch. In the closed position of the bistable hook 740, the net, mesh, string, or line may be coupled to both of the first and second hook elements in order to capture or carry the object or package, and in the open position of the bistable hook 740, the net, mesh, string, or line may be decoupled from the second hook element in order to release or drop the object or package.

Figure 8A:
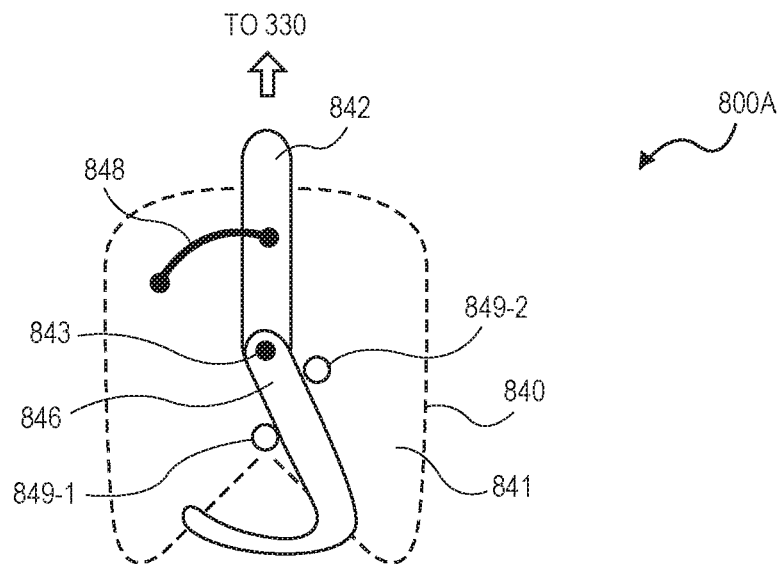
FIG. 8A is a schematic side view diagram of another example bistable hook in a closed position, in accordance with implementations of the present disclosure.
Figure 8B:
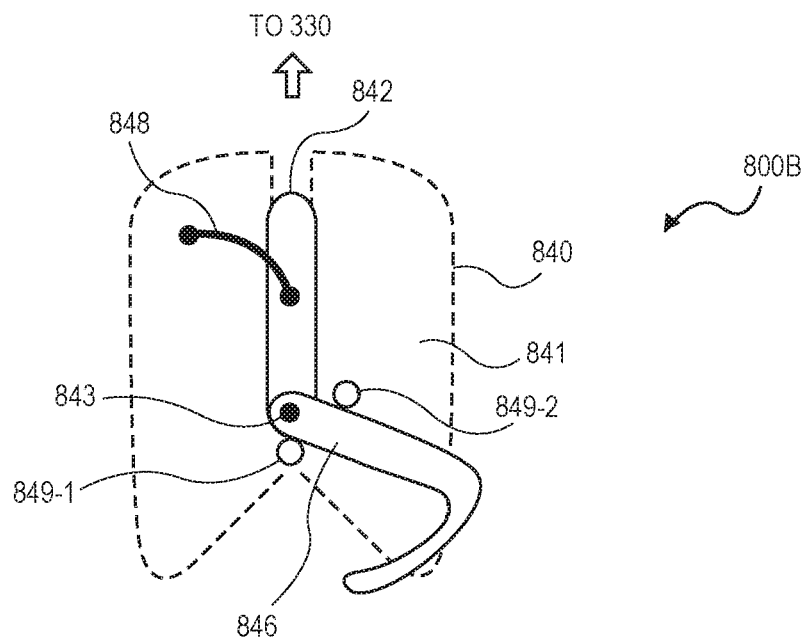
FIG. 8B is a schematic side view diagram of another example bistable hook in an open position, in accordance with implementations of the present disclosure.

FIG. 8A is a schematic side view diagram 800A of another example bistable hook in a closed position, in accordance with implementations of the present disclosure. FIG. 8B is a schematic side view diagram 800B of another example bistable hook in an open position, in accordance with implementations of the present disclosure. As shown in FIGS. 8A and 8B, the example bistable hook 840 may be another example of the bistable hook 340 schematically illustrated and described at least with respect to FIGS. 3A and 3B.

The bistable package delivery system may include a bistable hook 840 having two substantially stable positions or configurations. As shown in FIG. 8A, in a first stable position, the bistable hook 840 may be in a substantially closed state, position, or configuration to couple to and/or carry an object or package. As shown in FIG. 8B, in a second stable position, the bistable hook 840 may be in a substantially open state, position, or configuration to uncouple from and/or release an object or package. The bistable hook 840, and various components described herein, may be formed of various materials, such as composites, carbon fiber, metals, plastics, other materials, or combinations thereof.

In addition, the bistable hook 840, or various components thereof, may be connected to an end of the bistable beam 330. Movement of the bistable beam 330 between the retracted and extended positions may also cause raising and lowering of the bistable hook 840 that is coupled to an end of the bistable beam 330.

In the example embodiment of FIGS. 8A and 8B, the bistable hook 840 may include a housing 841, a plunger 842, a hook element 846, a linkage or pivot joint 843 between the plunger 842 and the hook element 846, a bias element 848, and guide elements 849-1, 849-2. The housing 841 may substantially surround or encompass all components of the bistable hook 840, except for portions of the plunger 842 and/or the hook element 846.

The plunger 842 may be configured to move vertically, as shown in FIGS. 8A and 8B, relative to the housing 841 between two stable positions. The plunger 842 may be connected to a first end of the hook element 846 via a linkage joint 843, and the hook element 846 may be rotatable or pivotable about the linkage joint 843. Also, a second end of the hook element 846 may be configured to couple to, carry, decouple from, and release an object or package.

In addition, the guide elements 849-1, 849-2 may be configured to cause rotation of the hook element 846 between the closed position, as shown in FIG. 8A, and the open position, as shown in FIG. 8B, responsive to movement of the plunger 842 between its two positions. For example, sides or surfaces of the hook element 846 may contact and move relative to the guide elements 849-1, 849-2 between the closed and open positions.

Further, the bias element 848 may be coupled between a portion of the housing 841 and a portion of the plunger 842. The bias element 848 may comprise spring steel or other flexible, resilient, or compressible materials configured to apply a bias force to the plunger 842, such that the plunger 842 is biased towards either of the two stable positions shown in FIGS. 8A and 8B. For example, during movement of the plunger 842 vertically relative to the housing 841 away from a first stable position and toward a second stable position, the bias element 848 may be compressed for a portion of the movement up to a maximum compression point, and then with continuing movement of the plunger 842 relative to the housing 841 away from the first stable position and toward the second stable position, the bias element 848 may be decompressed for a portion of the movement. As a result, on either side of the maximum compression point, the bias element 848 may bias the plunger 842 to respective stable positions, which correspond to either of the closed or open positions of the bistable hook 840.

As shown in FIG. 8A, the plunger 842 may be in a first stable position, e.g., moved vertically upward relative to the housing 841. The bias element 848 may apply a bias force to the plunger 842 to maintain the plunger in the first stable position. The hook element 846 that is coupled to the plunger 842 via linkage joint 843 may correspondingly move vertically upward and rotate around linkage joint 843 due to contact with guide elements 849-1, 849-2, such that the hook element 846 is in a closed position.

In contrast, as shown in FIG. 8B, the plunger 842 may be in a second stable position, e.g., moved vertically downward relative to the housing 841. The bias element 848 may apply a bias force to the plunger 842 to maintain the plunger in the second stable position. The hook element 846 that is coupled to the plunger 842 via linkage joint 843 may correspondingly move vertically downward and rotate around linkage joint 843 due to contact with guide elements 849-1, 849-2, such that the hook element 846 is in an open position.

Although FIGS. 8A and 8B show only one plunger 842, only one linkage joint 843, only one hook element 846, only one bias element 848, and a pair of guide elements 849-1, 849-2, other example embodiments of the bistable hook 840 may include other numbers, configurations, or arrangements of the various components of a bistable hook. For example, an example embodiment of the bistable hook 840 may include a pair of plungers 842, multiple corresponding linkage joints 843, a pair of hook elements 846, a pair of bias elements 848, and multiple corresponding guide elements 849. In addition, other example embodiments of the bistable hook 840 may include other numbers, configurations, or arrangements of plungers, linkage joints, hook elements, bias elements, and/or guide elements.

The bistable hook 840 may move between the closed position and the open position in an active or passive manner. In example embodiments in which movement of the bistable hook 840 is active, one or more actuators may be instructed to move the plunger 842 between the two stable positions to move the bistable hook 840 between the closed and open positions. The one or more actuators may comprise motors, servos, solenoids, linear actuators, or other types of actuators, and may receive power and/or instructions via one or more power and/or communication lines, such as power and/or communication lines 638 that extend along bistable beam 330 to the bistable hook 840.

In example embodiments in which movement of the bistable hook 840 is passive, the bistable hook 840 may be designed or configured to move between the closed and open positions based on at least one of relative displacement or relative acceleration between the plunger 842 and the housing 841. In one example embodiment, an end of the bistable beam 330 may be coupled to an upper end of the plunger 842 of the bistable hook 840. Initially, the bistable hook 840 may be coupled to an object or package and may be in the closed position, as shown in FIG. 8A. During extension of the bistable beam 330 to lower the bistable hook 840 carrying the object, the plunger 842 may not experience any, or may experience only minimal, displacement and/or acceleration relative to the housing 841, such that the bias element 848 maintains the bistable hook 840 in the closed position, as shown in FIG. 8A. Upon contacting the ground, e.g., upon the object carried by the bistable hook 840 contacting the ground or a portion of the bistable hook 840 contacting the ground, the plunger 842 may experience displacement and/or acceleration relative to the housing 841, e.g., displacement and/or acceleration above respective thresholds, such that the plunger 842 moves vertically past the maximum compression point associated with the bias element 848, and then biases the bistable hook 840 in the open position, as shown in FIG. 8B.

In another example embodiment, an end of the bistable beam 330 may be coupled to an upper end of the housing 841, but not to an upper end of the plunger 842, of the bistable hook 840. Initially, the bistable hook 840 may be coupled to an object or package and may be in the closed position, as shown in FIG. 8A. During extension of the bistable beam 330 to lower the bistable hook 840 carrying the object, the plunger 842 may not experience any, or may experience only minimal, acceleration relative to the housing 841, such that the bias element 848 maintains the bistable hook 840 in the closed position, as shown in FIG. 8A. Upon slowing or stopping the extension of the bistable beam 330 and/or upon contacting the ground, e.g., upon the object carried by the bistable hook 840 contacting the ground or a portion of the bistable hook 840 contacting the ground, the plunger 842 may experience acceleration relative to the housing 841, e.g., acceleration above a respective threshold, such that the plunger 842 moves vertically past the maximum compression point associated with the bias element 848, and then biases the bistable hook 840 in the open position, as shown in FIG. 8B.

In some example embodiments, in order to couple an object or package to one or more hook elements 846 of the bistable hook 840, the hook elements may attach or couple to loops, bars, handles, or other similar structures on the object or package. In other example embodiments, in order to couple an object or package to two or more hook elements 846 of the bistable hook 840, the hook elements may include an associated net, mesh, string, or line to carry or couple to the object or package. For example, the net, mesh, string, or line may be fixedly coupled to a first hook element, and may be removably coupled to a second hook element, e.g., via a loop or catch. In the closed position of the bistable hook 840, the net, mesh, string, or line may be coupled to both of the first and second hook elements in order to capture or carry the object or package, and in the open position of the bistable hook 840, the net, mesh, string, or line may be decoupled from the second hook element in order to release or drop the object or package.

Although the description herein generally relates to package delivery systems having a single bistable beam coupled to a single bistable hook, in other example embodiments, package delivery systems may have other numbers, configurations, or arrangements of bistable beams and bistable hooks. For example, a single bistable beam may include a plurality of bistable hooks at different positions and/or orientations. In addition, a plurality of bistable beams may be associated with a vehicle, e.g., an aerial vehicle, and each of the plurality of bistable beams may have different positions and/or orientations. Further, each of the plurality of bistable beams may include one or more bistable hooks.

Figure 9:
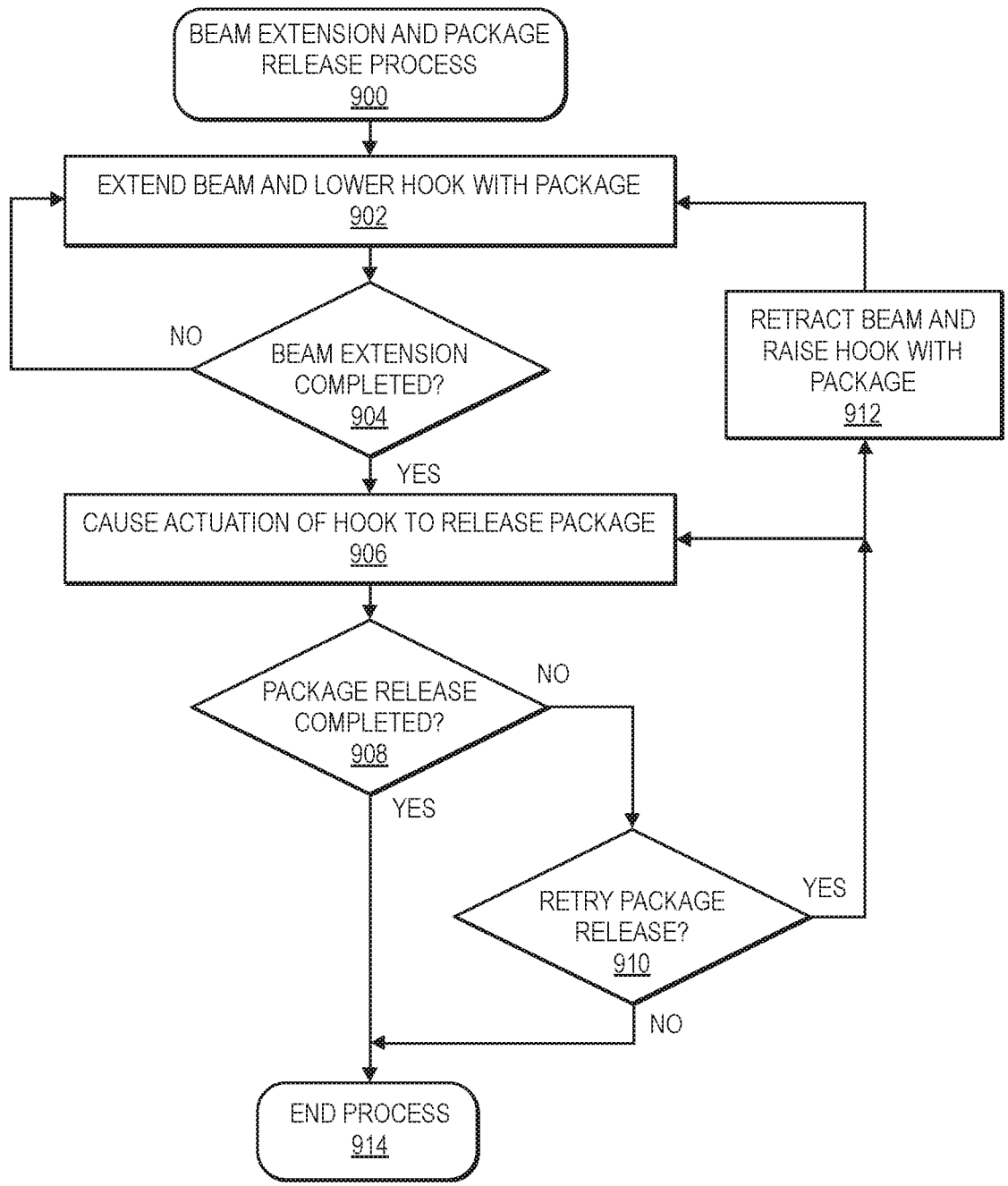
FIG. 9 is a flow diagram illustrating an example beam extension and package release process, in accordance with implementations of the present disclosure.

FIG. 9 is a flow diagram illustrating an example beam extension and package release process 900, in accordance with implementations of the present disclosure.

The process 900 may begin by extending a beam and lowering a hook with a package, as at 902. For example, a bistable beam may be extended from a reeled position towards an extended position, and a bistable hook that is coupled to an end of the bistable beam and carrying an object or package may be lowered, e.g., to a delivery destination. Further, a control system, e.g., an aerial vehicle control system, may instruct an actuator to move the bistable beam from a reeled position to an extended position, thereby lowering the bistable hook carrying an object.

In some example embodiments, the bistable beam may be extended all the way out, e.g., up to a full length of the bistable beam. In other example embodiments, the bistable beam may be extended a predetermined length or for a predetermined time period. The predetermined length or predetermined time period may be determined based on data from one or more sensors, e.g., imaging data of a delivery destination, depth data of a delivery destination, position or orientation data from navigation sensors of a vehicle, or other data.

In further example embodiments, the bistable beam may be extended, and the actuator or motor speed and/or current may be monitored to sense when the bistable beam, or bistable hook or object carried thereby, contacts a surface or ground. For example, upon contact with a surface or ground, a change in motor speed and/or current may be detected in order to determine that the bistable hook or object carried thereby is in proximity to a delivery destination. In still further example embodiments, the bistable beam may be extended, and tension along the bistable beam may be monitored to sense when the bistable beam, or bistable hook or object carried thereby, contacts a surface or ground. For example, upon contact with a surface or ground, a change in tension along the bistable beam may be detected, e.g., using one or more force or load sensors, or stress/strain sensors, in order to determine that the bistable hook or object carried thereby is in proximity to a delivery destination.

In various other example embodiments, various other sensors may be used, alone or in combination, to facilitate moving the bistable beam from a reeled position to an extended position, such as imaging devices, depth sensors, force or load sensors, stress/strain sensors, inertial measurement units, accelerometers, gyroscopes, magnetometers, or other types of sensors.

The process 900 may continue by determining whether beam extension is completed, as at 904. For example, depending upon the particular example method to move a bistable beam from a reeled position to an extended position, it may be determined whether beam extension is completed, e.g., upon extending the bistable beam all the way out, upon extending the bistable beam a predetermined length or for a predetermined time period, upon detecting contact with or proximity to a delivery destination, or based on other data. Further, a control system, e.g., an aerial vehicle control system, may determine whether extension of the bistable beam from a reeled position to an extended position is complete.

If beam extension is not completed, the process 900 may return to step 902 to continue extending the beam and lowering the hook with the package.

If, however, the beam extension is completed, the process 900 may proceed by causing actuation of a hook to release a package, as at 906. For example, a bistable hook coupled to an end of the bistable beam may move from a closed position to an open position to release an object or package carried by the bistable hook via active or passive methods. In some example embodiments for active release methods, an actuator associated with the bistable hook may cause release of an object carried by the bistable hook. In other example embodiments for passive release methods, at least one of relative displacement and/or relative acceleration between portions of the bistable hook, e.g., as a result of movement or changes in movement of the bistable beam and/or bistable hook, may cause release of an object carried by the bistable hook. Further, a control system, e.g., an aerial vehicle control system, may instruct or cause actuation of the bistable hook from a closed position to an open position to release an object.

The process 900 may then continue to determine whether package release is completed, as at 908. For example, various example methods may be used to determine whether an object or package carried by a bistable beam and bistable hook has been successfully released. Further, a control system, e.g., an aerial vehicle control system, may determine whether an object carried by the bistable hook has been successfully released.

In some example embodiments, the bistable beam may be at least partially retracted and/or a vehicle may briefly navigate, and the actuator or motor speed and/or current may be monitored to sense whether the bistable beam and bistable hook are still carrying the object or not. For example, upon retracting the bistable beam and bistable hook and/or upon briefly navigating away from a surface or ground, a change in motor speed and/or current may be detected in order to determine whether the bistable beam and bistable hook are still carrying the object or not. In still further example embodiments, the bistable beam may be at least partially retracted and/or a vehicle may briefly navigate, and tension along the bistable beam may be monitored to sense whether the bistable beam and bistable hook are still carrying the object or not. For example, upon retracting the bistable beam and bistable hook and/or upon briefly navigating away from a surface or ground, a change in tension along the bistable beam may be detected, e.g., using one or more force or load sensors, or stress/strain sensors, in order to determine whether the bistable beam and bistable hook are still carrying the object or not.

In various other example embodiments, various other sensors may be used, alone or in combination, to facilitate determining whether the bistable beam and bistable hook have successfully released an object, such as imaging devices, depth sensors, force or load sensors, stress/strain sensors, inertial measurement units, accelerometers, gyroscopes, magnetometers, or other types of sensors.

If it is determined that the package has been successfully released, then the beam extension and package release process 900 may end, as at 914.

If, however, it is determined that the package has not been successfully released, then the process 900 may proceed to determine whether package release is to be retried, as at 910. For example, the determination of whether to retry the release of an object or package may be based on various factors, e.g., a number of unsuccessful release attempts, amount of time spent at the delivery destination, a current time, detection of faults or errors with portions of the bistable beam and/or bistable hook, amount of energy or power remaining for a vehicle carrying the object, a type, category, weight, or other characteristics of an object or package, other objects in proximity within the environment, external forces affecting the vehicle or operation, external factors such as weather, wind, rain, or others, and/or various other factors. Further, a control system, e.g., an aerial vehicle control system, may determine whether release of an object carried by the bistable hook is to be attempted again.

If it is determined that release of the package is not to be attempted again, then the beam extension and package release process 900 may end, as at 914.

If, however, it is determined that release of the package is to be attempted again, then the process 900 may return to again causing actuation of the hook to release the package, as at 906, or may continue with retracting the beam and raising the hook with the package, as at 912, and then return to again extending the beam and lowering the hook with the package, as at 902. For example, depending upon the particular example method to move a bistable hook from a closed position to an open position, it may be determined how to retry release of the object or package carried by the bistable hook and bistable beam. Further, a control system, e.g., an aerial vehicle control system, may determine how to retry release of an object carried by the bistable hook, and may instruct or cause actuation of the bistable hook and/or retraction and extension of the bistable beam and bistable hook.

In some example embodiments for active release methods, an actuator associated with the bistable hook may cause release of an object carried by the bistable hook. In other example embodiments for passive release methods, at least one of relative displacement and/or relative acceleration between portions of the bistable hook, e.g., as a result of movement or changes in movement of the bistable beam and/or bistable hook, may cause release of an object carried by the bistable hook.

Following successful release of an object carried by a bistable hook, and/or after determining not to retry release of an object, the beam extension and package release process 900 may end, as at 914.

Figure 10:
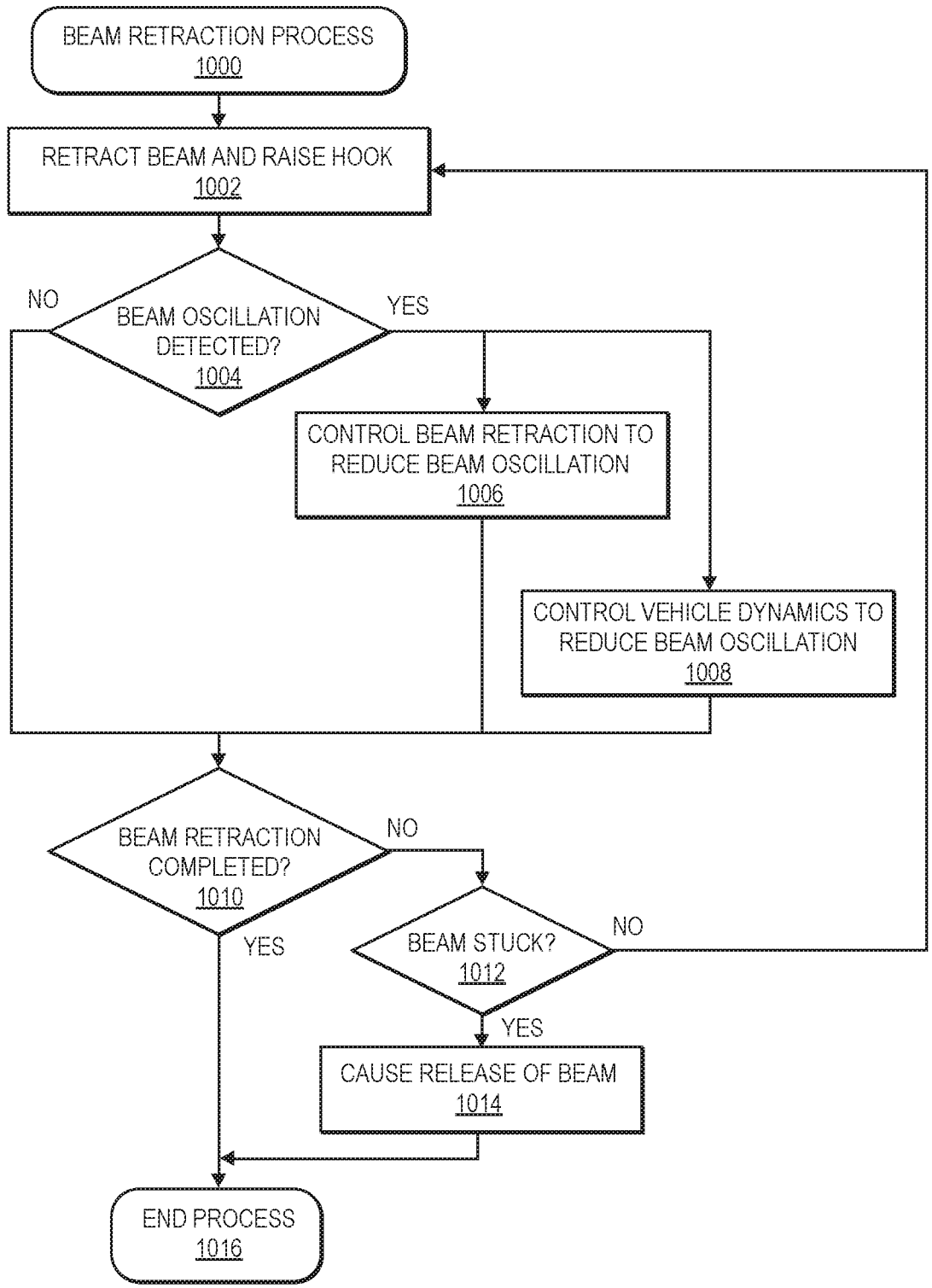
FIG. 10 is a flow diagram illustrating an example beam retraction process, in accordance with implementations of the present disclosure.

FIG. 10 is a flow diagram illustrating an example beam retraction process 1000, in accordance with implementations of the present disclosure.

The process 1000 may begin by retracting a beam and raising a hook, as at 1002. For example, a bistable beam may be retracted from an extended position to a reeled position, and a bistable hook that is coupled to an end of the bistable beam may be raised, e.g., away from a delivery destination. Further, a control system, e.g., an aerial vehicle control system, may instruct an actuator to move the bistable beam from an extended position to a reeled position, thereby raising the bistable hook.

In some example embodiments, the bistable beam may be retracted all the way in, e.g., up to a full length of the bistable beam. In other example embodiments, the bistable beam may be retracted a predetermined length or for a predetermined time period. The predetermined length or predetermined time period may be determined based on a predetermined length or predetermined time period over which the bistable beam had previously been extended, which may be determined based on data from one or more sensors, e.g., imaging data of a delivery destination, depth data of a delivery destination, position or orientation data from navigation sensors of a vehicle, or other data.

In further example embodiments, the bistable beam may be retracted, and the actuator or motor speed and/or current may be monitored to sense when the bistable beam and bistable hook have reached the reeled position. For example, upon fully retracting the bistable beam and bistable hook, a change in motor speed and/or current may be detected in order to determine that the bistable beam and bistable hook have reached the reeled position. In still further example embodiments, the bistable beam may be retracted, and tension along the bistable beam may be monitored to sense when the bistable beam and bistable hook have reached the reeled position. For example, upon fully retracting the bistable beam and bistable hook, a change in tension along the bistable beam may be detected, e.g., using one or more force or load sensors, or stress/strain sensors, in order to determine that the bistable beam and bistable hook have reached the reeled position.

In various other example embodiments, various other sensors may be used, alone or in combination, to facilitate moving the bistable beam from an extended position to a reeled position, such as imaging devices, depth sensors, force or load sensors, stress/strain sensors, inertial measurement units, accelerometers, gyroscopes, magnetometers, or other types of sensors.

The process 1000 may continue by determining whether beam oscillation is detected, as at 1004. For example, during retracting of the bistable beam and bistable hook, it may be determined whether oscillation or swinging of the bistable beam and bistable hook is detected. Data from one or more sensors, such as imaging devices, force or load sensors, stress/strain sensors, navigation sensors of a vehicle, or other types of sensors, may be used to detect whether the bistable beam and bistable hook are oscillating or swinging during retraction of the bistable beam. Further, a control system, e.g., an aerial vehicle control system, may determine whether oscillation or swinging of the bistable beam and bistable hook is detected.

In some example embodiments, force or load sensors or stress/strain sensors may detect periodic, oscillating, or repeating patterns of force, load, stress, or strain due to oscillation of a bistable beam and bistable hook. For example, at an approximate center point of an oscillation of a bistable beam and bistable hook, the detected force, load, stress, or strain may be local maximum values. In addition, at opposing ends or extremes of an oscillation of a bistable beam and bistable hook, the detected force, load, stress, or strain may be local minimum values.

In other example embodiments, the bistable beam may be retracted, and the actuator or motor speed and/or current may be monitored to sense periodic, oscillating, or repeating patterns of actuator speed and/or current due to oscillation of a bistable beam and bistable hook. For example, at an approximate center point of an oscillation of a bistable beam and bistable hook, the detected actuator speed may be a local minimum value and/or the detected actuator current may be a local maximum value. In addition, at opposing ends or extremes of an oscillation of a bistable beam and bistable hook, the detected actuator speed may be a local maximum value and/or the detected actuator current may be a local minimum value.

In still further example embodiments, the bistable beam may be retracted, and vehicle dynamics, such as forces, moments, torques, and other characteristics, may be monitored to sense periodic, oscillating, or repeating patterns of forces, moments, torques, and other characteristics transferred to the vehicle due to oscillation of a bistable beam and bistable hook, e.g., using one or more navigation sensors of an aerial vehicle. For example, the periodic, oscillating, or repeating patterns of forces, moments, torques, and other characteristics may include various local maximum values and local minimum values during oscillation of the bistable beam and bistable hook.

If it is determined that beam oscillation is detected, then the process 1000 may proceed by controlling beam retraction to reduce beam oscillation, as at 1006. For example, responsive to detecting periodic, oscillating, or repeating patterns of force, load, stress, strain, actuator speed, and/or actuator current, as well as forces, moments, torques, and other characteristics of a vehicle, due to oscillation of a bistable beam and bistable hook, retracting of a bistable beam and bistable hook may be controlled, adjusted, or modified to reduce beam oscillation. Further, a control system, e.g., an aerial vehicle control system, may instruct or control beam retraction to reduce oscillation or swinging of the bistable beam and bistable hook.

In one example, the bistable beam may be retracted, or may be retracted at a greater speed, when the detected force, load, stress, strain, and/or actuator current may be at local minimum values, and/or when the detected actuator speed may be at local maximum values. In another example, the bistable beam may not be retracted, or may be retracted at a lesser speed, when the detected force, load, stress, strain, and/or actuator current may be at local maximum values, and/or when the detected actuator speed may be at local minimum values. In still another example, the bistable beam may be at least partially extended when the detected force, load, stress, strain, and/or actuator current may be at local maximum values, and/or when the detected actuator speed may be at local minimum values. By instructing or controlling beam retraction using one or more of these various examples, oscillation or swinging of the bistable beam and bistable hook may not be increased, and preferably, oscillation or swinging of the bistable beam and bistable hook may be reduced or minimized.

Further, if it is determined that beam oscillation is detected, the process 1000 may proceed by controlling vehicle dynamics to reduce beam oscillation, as at 1008. For example, responsive to detecting periodic, oscillating, or repeating patterns of force, load, stress, strain, actuator speed, and/or actuator current, as well as forces, moments, torques, and other characteristics of a vehicle, due to oscillation of a bistable beam and bistable hook, navigation, flight, or operations of a vehicle, e.g., an aerial vehicle, coupled to the bistable beam and bistable hook may be controlled, adjusted, or modified to reduce beam oscillation. Further, a control system, e.g., an aerial vehicle control system, may instruct or control navigation, flight, or operations of the aerial vehicle to reduce oscillation or swinging of the bistable beam and bistable hook.

In one example, an aerial vehicle may adjust or modify its pitch, roll, and/or yaw, e.g., by substantially matching the pitch, roll, and/or yaw of the vehicle to the beam oscillation, to reduce the beam oscillation. In another example, an aerial vehicle may hover or initiate vertical flight, e.g., in a substantially vertically upward direction, to impart substantially vertically downward forces upon the bistable beam and bistable hook and reduce the beam oscillation. In still another example, an aerial vehicle may initiate horizontal flight, e.g., in a substantially horizontal direction, to impart substantially horizontal forces upon the bistable beam and bistable hook and reduce the beam oscillation. By instructing or controlling beam retraction using one or more of these various examples, oscillation or swinging of the bistable beam and bistable hook may not be increased, and preferably, oscillation or swinging of the bistable beam and bistable hook may be reduced or minimized.

Furthermore, the various examples of controlling beam retraction to reduce beam oscillation and the various examples of controlling vehicle dynamics to reduce beam oscillation may be combined in various combinations to further reduce or control beam oscillation during retraction from an extended position to a reeled position.

The process 1000 may then continue to determine whether beam retraction is completed, as at 1010. For example, depending upon the particular example method to move a bistable beam from an extended position to a reeled position, it may be determined whether beam retraction is completed, e.g., upon retracting the bistable beam all the way in, upon retracting the bistable beam a predetermined length or for a predetermined time period, upon detecting that the bistable beam has reached the reeled position, or based on other data. Further, a control system, e.g., an aerial vehicle control system, may determine whether retraction of the bistable beam from an extended position to a reeled position is complete.

If it is determined that the beam retraction has been successfully completed, then the beam retraction process 1000 may end, as at 1016.

If, however, it is determined that the beam retraction has not been successfully completed, then the process 1000 may proceed to determine whether the beam is stuck, as at 1012. For example, a portion of the bistable beam and/or the bistable hook may become caught, tangled, snagged, or otherwise stuck on a portion of an environment, e.g., a tree, plant, ground element, structure, or others. Data from one or more sensors, such as imaging devices, force or load sensors, stress/strain sensors, navigation sensors of a vehicle, or other types of sensors, may be used to detect whether the bistable beam and bistable hook are caught or stuck during retraction of the bistable beam. Further, a control system, e.g., an aerial vehicle control system, may determine whether the bistable beam and bistable hook are caught or stuck.

In some example embodiments, during retraction of the bistable beam and/or during navigation of a vehicle, the actuator or motor speed and/or current may be monitored to sense whether the bistable beam and bistable hook are caught or stuck on a portion of an environment. For example, during retraction of the bistable beam and bistable hook and/or during navigation by an aerial vehicle away from a surface or ground, a change in motor speed and/or current may be detected in order to determine whether the bistable beam and bistable hook are caught or stuck on a portion of an environment. In further example embodiments, during retraction of the bistable beam and/or during navigation of a vehicle, tension along the bistable beam may be monitored to sense whether the bistable beam and bistable hook are caught or stuck on a portion of an environment. For example, during retraction of the bistable beam and bistable hook and/or during navigation by an aerial vehicle away from a surface or ground, a change in tension along the bistable beam may be detected, e.g., using one or more force or load sensors, or stress/strain sensors, in order to determine whether the bistable beam and bistable hook are caught or stuck on a portion of an environment. In still further example embodiments, during retraction of the bistable beam and/or during navigation of a vehicle, vehicle dynamics, such as forces, moments, torques, and other characteristics, may be monitored to sense whether the bistable beam and bistable hook are caught or stuck on a portion of an environment. For example, during retraction of the bistable beam and bistable hook and/or during navigation by an aerial vehicle away from a surface or ground, a change in forces, moments, torques, and other characteristics transferred to the vehicle along the bistable beam may be detected, e.g., using one or more navigation sensors of an aerial vehicle, in order to determine whether the bistable beam and bistable hook are caught or stuck on a portion of an environment.

In various other example embodiments, various other sensors may be used, alone or in combination, to facilitate determining whether the bistable beam and bistable hook are caught or stuck on a portion of an environment, such as imaging devices, depth sensors, force or load sensors, stress/strain sensors, inertial measurement units, accelerometers, gyroscopes, magnetometers, or other types of sensors.

If it is determined that the beam is not stuck, then the process 1000 may return to continue to retract the beam and raise the hook, as at 1002.

If, however, it is determined that the beam is stuck, then the process 1000 may continue with causing release of the beam, as at 1014. For example, a bistable beam, or one or more sections thereof, may be released, broken, or otherwise separated from the vehicle and/or other sections of the bistable beam via active or passive methods. In some example embodiments for active release methods, an actuator associated with the bistable beam may cause release or separation of the bistable beam from the vehicle, such as by disconnecting or releasing a frangible connection of the bistable beam, or by transmitting current to a heating element to melt a frangible connection of the bistable beam. In other example embodiments for active release methods, an actuator associated with the bistable beam may cause separation of sections of the bistable beam from each other, such as by disconnecting or separating sections of the bistable beam at a frangible portion, or by transmitting current to a heating element to melt a frangible portion. In further example embodiments for passive release methods, at least one of a force, load, stress, or strain applied to a bistable beam may cause release, separation, disconnection, or breakage of a frangible connection of the bistable beam, or a frangible portion between sections of the bistable beam. Further, a control system, e.g., an aerial vehicle control system, may instruct or cause release, separation, or breakage of the bistable beam, or one or more sections thereof, from the vehicle and/or other sections of the bistable beam.

Following successful retraction of a bistable beam and bistable hook, and/or after causing release of a bistable beam and bistable hook, the beam retraction process 1000 may end, as at 1016.

Figure 11:
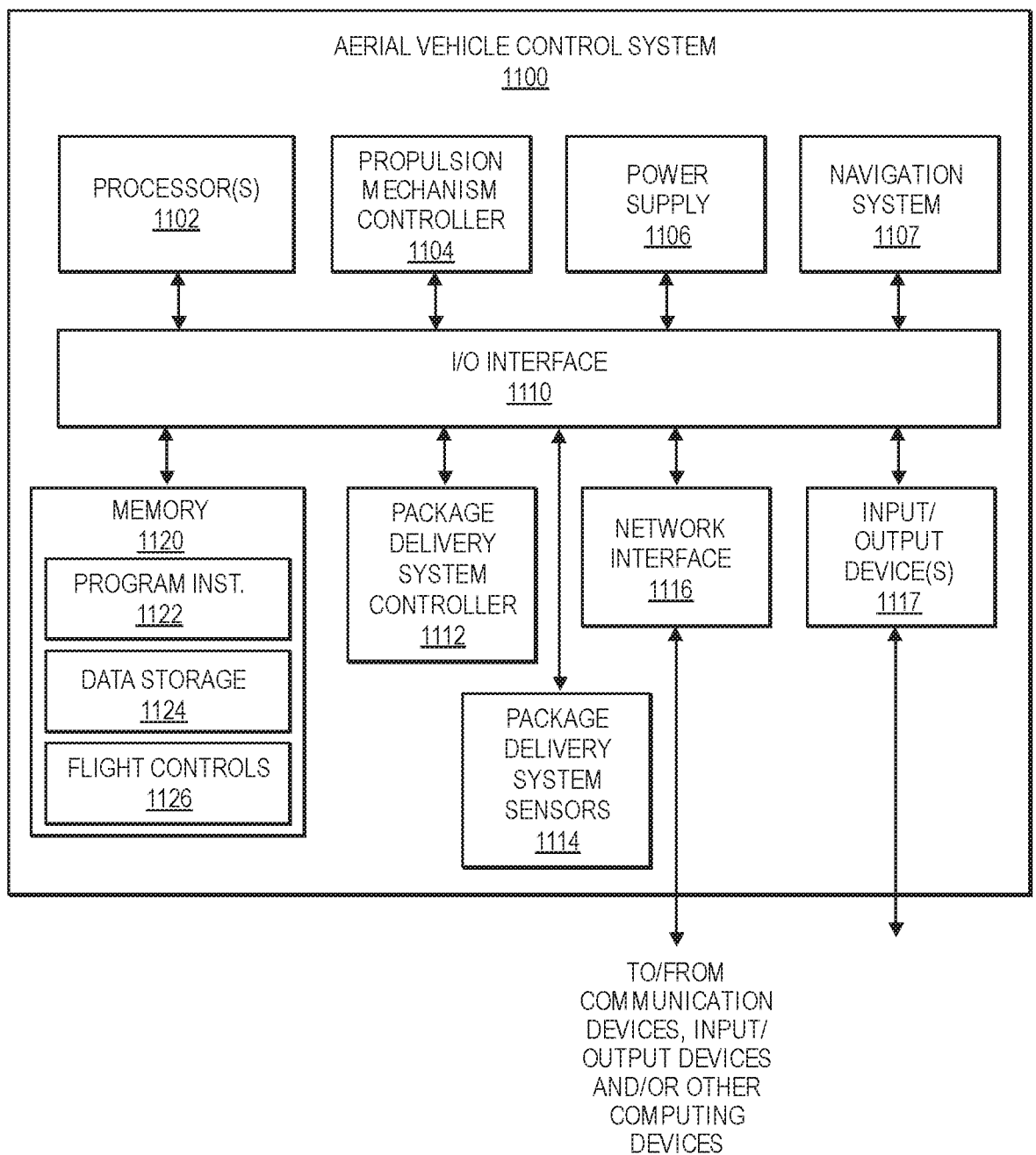
FIG. 11 is a block diagram illustrating various components of an example aerial vehicle control system, in accordance with implementations of the present disclosure.

FIG. 11 is a block diagram illustrating various components of an example aerial vehicle control system or controller 1100, in accordance with implementations of the present disclosure.

In various examples, the block diagram may be illustrative of one or more aspects of the aerial vehicle control system 1100 that may be used to implement the various systems and processes discussed above. In the illustrated implementation, the aerial vehicle control system 1100 includes one or more processors 1102, coupled to a non-transitory computer readable storage medium 1120 via an input/output (I/O) interface 1110. The aerial vehicle control system 1100 may also include a propulsion controller 1104, a power supply or battery 1106, and/or a navigation system 1107. The aerial vehicle control system 1100 may further include a package delivery system controller 1112, package delivery system sensors 1114, a network interface 1116, and one or more input/output devices 1117.

In various implementations, the aerial vehicle control system 1100 may be a uniprocessor system including one processor 1102, or a multiprocessor system including several processors 1102 (e.g., two, four, eight, or another suitable number). The processor(s) 1102 may be any suitable processor capable of executing instructions. For example, in various implementations, the processor(s) 1102 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 1102 may commonly, but not necessarily, implement the same ISA.

The non-transitory computer readable storage medium 1120 may be configured to store executable instructions, data, and package delivery system or apparatus data and/or characteristics, including bistable beam data, bistable beam actuator data, frangible connections data, frangible portions data, sensor data, actuator data, bistable hook data, object or package data, vehicle data, flight data, navigation data, environment data, and/or other data items accessible by the processor(s) 1102. In various implementations, the non-transitory computer readable storage medium 1120 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 1120 as program instructions 1122, data storage 1124 and flight controls 1126, respectively. In other implementations, program instructions, data and/or package delivery system or apparatus data may be received, sent or stored upon different types of computer-accessible media, such as non-transitory media, or on similar media separate from the non-transitory computer readable storage medium 1120 or the aerial vehicle control system 1100.

Generally, a non-transitory, computer readable storage medium may include storage media or memory media such as magnetic or optical media, e.g., disk or CD/DVD-ROM, coupled to the aerial vehicle control system 1100 via the I/O interface 1110. Program instructions and data stored via a non-transitory computer readable medium may be transmitted by transmission media or signals, such as electrical, electromagnetic, or digital signals, which may be conveyed via a communication medium such as a network and/or a wireless link, such as may be implemented via the network interface 1116.

In one implementation, the I/O interface 1110 may be configured to coordinate I/O traffic between the processor(s) 1102, the non-transitory computer readable storage medium 1120, and any peripheral devices, the network interface 1116 or other peripheral interfaces, such as input/output devices 1117. In some implementations, the I/O interface 1110 may perform any necessary protocol, timing or other data transformations to convert data signals from one component (e.g., non-transitory computer readable storage medium 1120) into a format suitable for use by another component (e.g., processor(s) 1102). In some implementations, the I/O interface 1110 may include support for devices attached through various types of peripheral buses, such as a variant of the Peripheral Component Interconnect (PCI) bus standard or the Universal Serial Bus (USB) standard, for example. In some implementations, the function of the I/O interface 1110 may be split into two or more separate components, such as a north bridge and a south bridge, for example. Also, in some implementations, some or all of the functionality of the I/O interface 1110, such as an interface to the non-transitory computer readable storage medium 1120, may be incorporated directly into the processor(s) 1102.

The propulsion controller 1104 communicates with the navigation system 1107 and adjusts the operational characteristics of each propulsion mechanism to guide the aerial vehicle along a determined path and/or to perform other navigational maneuvers. The navigation system 1107 may include a GPS, inertial measurement unit, accelerometer, gyroscope, magnetometer, other sensors, or other similar systems than can be used to navigate the aerial vehicle to and/or from a location.

The aerial vehicle control system 1100 may also include a package delivery system controller 1112 that communicates with the processor(s) 1102, the power supply 1106, the navigation system 1107, the non-transitory computer readable storage medium 1120, and/or other components or elements described herein to instruct, control, or command the package delivery system, including moving the bistable beam between reeled and extended positions, moving the bistable hook between closed and open positions, and various other operations or functions described herein. In further example embodiments, the package delivery system controller 1112 may include a plurality of controllers associated with various portions or components of the package delivery system, e.g., a controller associated with the bistable beam, a controller associated with the actuator, a controller associated with the bistable hook, and/or controllers associated with other sensors, actuators, or active elements, each of which may instruct, control, or command, individually and/or collectively, various operations or functions described herein.

The network interface 1116 may be configured to allow data to be exchanged between the aerial vehicle control system 1100, other devices attached to a network, such as other computer systems, and/or control systems of other vehicles, systems, machines, equipment, apparatuses, systems, devices, and/or delivery or loading locations. For example, the network interface 1116 may enable wireless communication between numerous vehicles, such as aerial vehicles, ground based vehicles, water based vehicles, or other types of vehicles. In various implementations, the network interface 1116 may support communication via wireless general data networks, such as a Wi-Fi network. For example, the network interface 1116 may support communication via telecommunications networks such as cellular communication networks, satellite networks, and the like.

Input/output devices 1117 may, in some implementations, include one or more displays, imaging sensors, image capture devices, thermal sensors, infrared sensors, time of flight sensors, force or load sensors, stress/strain sensors, inertial measurement units, accelerometers, gyroscopes, magnetometers, pressure sensors, weather sensors, various other sensors described herein, etc. Multiple input/output devices 1117 may be present and controlled by the aerial vehicle control system 1100. One or more of these sensors may be utilized to assist in performing the various functions, operations, and processes described herein.

As shown in FIG. 11, the memory may include program instructions 1122 which may be configured to implement the example processes and/or sub-processes described above. The data storage 1124 may include various data stores for maintaining data items that may be provided for performing the various functions, operations, and processes described herein. For example, the data storage 1124 may include package delivery system or apparatus data and/or characteristics, including bistable beam data, bistable beam actuator data, frangible connections data, frangible portions data, sensor data, actuator data, bistable hook data, object or package data, vehicle data, flight data, navigation data, environment data, and/or other data items.

Those skilled in the art will appreciate that the aerial vehicle control system 1100 is merely illustrative and is not intended to limit the scope of the present disclosure. In particular, the computing system and devices may include any combination of hardware or software that can perform the indicated functions, including other control systems or controllers, computers, network devices, internet appliances, PDAs, wireless phones, pagers, etc. The aerial vehicle control system 1100 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

While the above examples have been described with respect to aerial vehicles, the disclosed implementations may also be used for other forms of vehicles, including, but not limited to, ground based vehicles, water based vehicles, and space based vehicles.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 9 and 10, orders in which such methods or processes are presented are not intended to be construed as any limitation on the claimed inventions, and any number of the method or process steps or boxes described herein can be omitted, reordered, or combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A package delivery system, comprising:
    a bistable beam configured to move between a reeled position and an extended position, wherein the bistable beam has a substantially flat cross-sectional shape in the reeled position, and the bistable beam has an at least partially curved cross-sectional shape in the extended position;
    an actuator configured to cause movement of the bistable beam;
    a bistable hook coupled to an end of the bistable beam, the bistable hook configured to move between a closed position and an open position, and the bistable hook configured to couple to an object in the closed position; and
    a control system configured to at least:
        instruct the actuator to cause movement of the bistable beam between the reeled position and the extended position.

2. The package delivery system of claim 1, further comprising:
    a frangible connection associated with the bistable beam;
    wherein the frangible connection is configured to decouple the bistable beam responsive to a force applied to the bistable beam that exceeds a threshold.

3. The package delivery system of claim 2, wherein the control system is further configured to:
    determine the force applied to the bistable beam that exceeds the threshold based at least in part on data associated with at least one of a speed of the actuator, a current associated with the actuator, an imaging device, a force or load sensor, a stress/strain sensor, an inertial measurement unit, an accelerometer, a gyroscope, or a magnetometer.

4. The package delivery system of claim 2, further comprising:
    an active element associated with the frangible connection, the active element comprising at least one of a heating element, an electromagnetic clamp, a servo, or a solenoid;
    wherein the control system is further configured to:
        cause the active element to actuate the frangible connection to decouple the bistable beam responsive to the force applied to the bistable beam that exceeds the threshold.

5. The package delivery system of claim 1, further comprising:
    at least one frangible portion along the bistable beam;
    wherein the at least one frangible portion is configured to decouple sections of the bistable beam from each other responsive to a force applied to the bistable beam that exceeds a threshold.

6. The package delivery system of claim 5, further comprising:
    an active element associated with the at least one frangible portion, the active element comprising at least one of a heating element, an electromagnetic clamp, a servo, or a solenoid; and
    a conductor extending along the bistable beam and communicatively coupled to the active element;
    wherein the control system is further configured to:
        cause the active element to actuate the at least one frangible portion to decouple the sections of the bistable beam from each other responsive to the force applied to the bistable beam that exceeds the threshold.

7. The package delivery system of claim 1, wherein the bistable hook further comprises:
    a housing;
    a plunger configured to move relative to the housing;
    a hook element operatively connected to the plunger and configured to move between the closed position and the open position; and
    a bias element operatively connected to the plunger and the hook element, and configured to cause the hook element to move to the closed position or the open position.

8. The package delivery system of claim 7, wherein the bistable beam is coupled to the plunger of the bistable hook; and
    wherein the control system is configured to cause movement of the hook element between the closed position and the open position by at least one of relative displacement or relative acceleration between the housing and the plunger.

9. The package delivery system of claim 7, wherein the bistable beam is coupled to the housing of the bistable hook; and
    wherein the control system is configured to cause movement of the hook element between the closed position and the open position by relative acceleration between the housing and the plunger.

10. The package delivery system of claim 7, wherein the bistable hook further comprises:
- a hook actuator operatively connected to one of the plunger or the hook element;
- wherein the control system is configured to instruct the hook actuator to cause movement of the hook element between the closed position and the open position.

11. A method to deliver an object, comprising:
- instructing, by a control system, an actuator to cause movement of a bistable beam from a reeled position to an extended position, wherein the bistable beam has a substantially flat cross-sectional shape in the reeled position, and the bistable beam has an at least partially curved cross-sectional shape in the extended position, and wherein the bistable beam is coupled to a bistable hook; and
- causing, by the control system, the bistable hook to move from a closed position to an open position to release an object carried by the bistable hook.

12. The method of claim 11, further comprising:
- determining, by the control system, a force applied to the bistable beam responsive to moving the bistable hook from the closed position to the open position; and
- determining, by the control system, that the object is released by the bistable hook based at least in part on the determined force applied to the bistable beam.

13. The method of claim 11, further comprising:
- instructing, by the control system, the actuator to cause movement of the bistable beam from the extended position to the reeled position.

14. The method of claim 13, further comprising:
- determining, by the control system, forces applied to the bistable beam during the movement from the extended position to the reeled position; and
- at least one of:
  - controlling, by the control system, the movement of the bistable beam based at least in part on the determined forces; or
  - modifying, by the control system, operation of an aerial vehicle to which the bistable beam is coupled based at least in part on the determined forces.

15. The method of claim 14, further comprising:
- determining, by the control system, that a force applied to the bistable beam exceeds a threshold during the movement from the extended position to the reeled position; and
- causing, by the control system, at least a portion of the bistable beam to be decoupled from the aerial vehicle responsive to the determined force that exceeds the threshold.

16. An apparatus, comprising:
- a package delivery system including a bistable beam coupled to a bistable hook, the bistable beam configured to move between a reeled position and an extended position, and the bistable hook configured to move between a closed position and an open position, wherein the bistable beam has a substantially flat cross-sectional shape in the reeled position, and the bistable beam has a substantially curved cross-sectional shape in the extended position; and
- a control system configured to at least:
  - cause extension of the bistable beam from the reeled position to the extended position;
  - cause movement of the bistable hook from the closed position to the open position to release a package carried by the bistable hook; and
  - cause retraction of the bistable beam from the extended position to the reeled position.

17. The apparatus of claim 16, wherein the package delivery system further includes an actuator coupled to the bistable beam; and
- wherein the control system is configured to instruct the actuator to cause extension and retraction of the bistable beam between the reeled and extended positions.

18. The apparatus of claim 16, wherein the package delivery system further includes an actuator associated with the bistable hook; and
- wherein the control system is configured to instruct the actuator to cause movement of the bistable hook between the closed and open positions.

* * * * *